United States Patent
Wern et al.

(10) Patent No.: US 10,167,671 B2
(45) Date of Patent: Jan. 1, 2019

(54) POWER SUPPLY FOR A TOP DRIVE

(71) Applicant: Weatherford Technology Holdings, LLC, Houston, TX (US)

(72) Inventors: Frank Wern, Hannover (DE); Federico Amezaga, Cypress, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 214 days.

(21) Appl. No.: 15/004,503

(22) Filed: Jan. 22, 2016

(65) Prior Publication Data

US 2017/0211327 A1    Jul. 27, 2017

(51) Int. Cl.
  *E21B 3/02*    (2006.01)
  *H02J 50/90*    (2016.01)
  *H02J 50/12*    (2016.01)

(52) U.S. Cl.
  CPC .............. *E21B 3/02* (2013.01); *H02J 50/12* (2016.02); *H02J 50/90* (2016.02)

(58) Field of Classification Search
  CPC .............. E21B 3/02; H02J 50/12; H02J 50/90
  See application file for complete search history.

(56) References Cited

U.S. PATENT DOCUMENTS

| | | |
|---|---|---|
| 1,367,156 A | 2/1921 | McAlvay et al. |
| 1,822,444 A | 9/1931 | MacClatchie |
| 2,370,354 A | 2/1945 | Hurst |
| 3,147,992 A | 9/1964 | Haeber et al. |
| 3,354,951 A | 11/1967 | Savage et al. |
| 3,385,370 A | 5/1968 | Knox et al. |
| 3,662,842 A | 5/1972 | Bromell |
| 3,698,426 A | 10/1972 | Litchfield et al. |
| 3,747,675 A | 7/1973 | Brown |
| 3,766,991 A | 10/1973 | Brown |

(Continued)

FOREIGN PATENT DOCUMENTS

| | | |
|---|---|---|
| AU | 2012201644 A1 | 4/2012 |
| AU | 2013205714 A1 | 5/2013 |

(Continued)

OTHER PUBLICATIONS

A123 Systems, 14Ah Prismatic Pouch Cell, Product Specification, www.a123systems.com.

(Continued)

*Primary Examiner* — James G Sayre
(74) *Attorney, Agent, or Firm* — Patterson + Sheridan, LLP

(57) ABSTRACT

A method and apparatus for suppling non-hydraulic power to a tool unit during well operation. A top drive supplies power to a power consumer of the tool unit with a non-hydraulic power supply: a mechanical power coupling from the top drive to the tool unit, a wireless power coupling from the top drive to the tool unit, a local power supply on the tool unit, and/or combinations thereof. The non-hydraulic power supply may be capable of supplying at least 2 kW for at least 10 s. The system may include a fixed gear coupled to the top drive, a slewing ring meshed to the fixed gear, and a revolving gear meshed with the slewing ring and coupled to the tool unit. The slewing ring is configured to transfer rotational force from the fixed gear to the revolving gear, and may be rotated by rotating a torque shaft or actuating the fixed gear.

20 Claims, 18 Drawing Sheets

(56) References Cited

U.S. PATENT DOCUMENTS

| | | |
|---|---|---|
| 3,776,320 A | 12/1973 | Brown |
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jürgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,303,022 B2 | 12/2007 | Tilton et al. |
| 7,325,610 B2 | 2/2008 | Giroux et al. |
| 7,353,880 B2 | 4/2008 | Pietras |
| 7,448,456 B2 | 11/2008 | Shahin et al. |
| 7,451,826 B2 | 11/2008 | Pietras |
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,591,304 B2 | 9/2009 | Juhasz et al. |
| 7,617,866 B2 | 11/2009 | Pietras |
| 7,635,026 B2 | 12/2009 | Mosing et al. |

(56) References Cited

U.S. PATENT DOCUMENTS

| | | |
|---|---|---|
| 7,665,515 B2 | 2/2010 | Mullins |
| 7,665,530 B2 | 2/2010 | Wells et al. |
| 7,665,531 B2 | 2/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Augman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,118,106 B2 | 2/2012 | Wiens et al. |
| 8,141,642 B2 | 3/2012 | Olstad et al. |
| 8,210,268 B2 | 7/2012 | Heidecke et al. |
| 8,281,856 B2 | 10/2012 | Jahn et al. |
| 8,307,903 B2 | 11/2012 | Redlinger et al. |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,893,772 B2 | 11/2014 | Henderson et al. |
| 9,068,406 B2 | 6/2015 | Clasen et al. |
| 9,206,851 B2 | 12/2015 | Slaughter, Jr. et al. |
| 9,631,438 B2 | 4/2017 | McKay |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0216924 A1 | 11/2004 | Pietras et al. |
| 2005/0000691 A1 | 1/2005 | Giroux et al. |
| 2005/0206163 A1 | 9/2005 | Guesnon et al. |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1* | 12/2005 | Folk ............ E21B 19/02 166/77.52 |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2007/0044973 A1 | 3/2007 | Fraser et al. |
| 2007/0074874 A1 | 4/2007 | Richardson |
| 2007/0102992 A1 | 5/2007 | Jager |
| 2007/0131416 A1 | 6/2007 | Odell, II et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth, Jr. et al. |
| 2007/0251701 A1 | 11/2007 | Jahn et al. |
| 2008/0059073 A1 | 3/2008 | Giroux et al. |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0151934 A1 | 6/2009 | Heidecke et al. |
| 2009/0159294 A1 | 6/2009 | Abdollahi et al. |
| 2009/0200038 A1 | 8/2009 | Swietlik et al. |
| 2009/0205820 A1 | 8/2009 | Koederitz et al. |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0321086 A1* | 12/2009 | Zimmermann ......... E21B 19/07 166/379 |
| 2010/0032162 A1 | 2/2010 | Olstad et al. |
| 2010/0101805 A1 | 4/2010 | Angelle et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2011/0036586 A1 | 2/2011 | Hart et al. |
| 2011/0039086 A1 | 2/2011 | Graham et al. |
| 2011/0214919 A1 | 9/2011 | McClung, III |
| 2011/0280104 A1 | 11/2011 | McClung, III |
| 2012/0048574 A1 | 3/2012 | Wiens et al. |
| 2012/0152530 A1 | 6/2012 | Wiedecke et al. |
| 2012/0160517 A1 | 6/2012 | Bouligny et al. |
| 2012/0212326 A1 | 8/2012 | Christiansen et al. |
| 2012/0234107 A1 | 9/2012 | Pindiprolu et al. |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietras |
| 2013/0207382 A1 | 8/2013 | Robichaux |
| 2013/0207388 A1 | 8/2013 | Jansson et al. |
| 2013/0233624 A1 | 9/2013 | In |
| 2013/0269926 A1 | 10/2013 | Liess et al. |
| 2013/0271576 A1 | 10/2013 | Elllis |
| 2013/0275100 A1 | 10/2013 | Ellis et al. |
| 2013/0299247 A1 | 11/2013 | Küttel et al. |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0262521 A1 | 9/2014 | Bradley et al. |
| 2014/0305662 A1 | 10/2014 | Giroux et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0337648 A1 | 11/2015 | Zippel et al. |
| 2016/0024862 A1 | 1/2016 | Wilson et al. |
| 2016/0138348 A1 | 5/2016 | Kunec |
| 2016/0145954 A1 | 5/2016 | Helms et al. |
| 2016/0215592 A1 | 7/2016 | Helms et al. |
| 2016/0230481 A1 | 8/2016 | Misson et al. |
| 2017/0044854 A1 | 2/2017 | Hebebrand et al. |
| 2017/0044875 A1 | 2/2017 | Hebebrand et al. |
| 2017/0051568 A1 | 2/2017 | Wern et al. |
| 2017/0067303 A1 | 3/2017 | Thiemann et al. |
| 2017/0067320 A1 | 3/2017 | Zouhair et al. |

(56) References Cited

U.S. PATENT DOCUMENTS

| | | |
|---|---|---|
| 2017/0074075 A1 | 3/2017 | Liess |
| 2017/0211343 A1 | 7/2017 | Thiemann |
| 2017/0284164 A1 | 10/2017 | Holmes et al. |

FOREIGN PATENT DOCUMENTS

| | | |
|---|---|---|
| AU | 2014215938 A1 | 9/2014 |
| CA | 2 707 050 A1 | 6/2009 |
| CA | 2 841 654 A1 | 8/2015 |
| CA | 2 944 327 A1 | 10/2015 |
| EP | 0 250 072 A2 | 12/1987 |
| EP | 1 619 349 A2 | 1/2006 |
| EP | 1 772 715 A2 | 4/2007 |
| EP | 1 961 912 A1 | 8/2008 |
| EP | 1 961 913 A1 | 8/2008 |
| EP | 2 322 357 A1 | 5/2011 |
| GB | 2 077 812 A | 12/1981 |
| GB | 2 180 027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A2 | 1/2007 |
| WO | 2007/070805 A2 | 6/2007 |
| WO | 2009/076648 A2 | 6/2009 |
| WO | 2012/115717 A2 | 8/2012 |
| WO | 2015/000023 A1 | 1/2015 |
| WO | 2015/119509 A1 | 8/2015 |
| WO | 2015/127433 A1 | 8/2015 |

OTHER PUBLICATIONS

Warrior, 250E Electric Top Drive (250-TON), 250H Hydraulic Top Drive (250-TON), Brochure, Apr. 2014, Rev. 1, www.warriorrig.com.
Warrior, 500E Electric Top Drive (500 ton—1000hp), Brochure, Document No. EC 009, May 2015, Rev. 3, www.warriorrig.com.
Weatherford, TorkSub™ Stand-Alone Torque Measuring System, Product Specification, Document No. 11368.00, Copyright 2011-2014, www.weatherford.com.
EPO Extended European Search Report dated Jun. 8, 2017 for European Application No. 17152458.0.
EPO Extended European Search Report dated Jun. 8, 2017, for European Patent Application No. 17152458.0.
Canadian Office Action dated Mar. 28, 2018, for Canadian Patent Application No. 2,955,754.
PCT International Search Report and Written Opinion dated Jun. 8, 2017, for International Application No. PCT/US2017/014224.
Australian Examination Report dated Sep. 19, 2017, for Australian Patent Application No. 2017200371.
Australian Examination Report dated Feb. 8, 2018 for Australian Patent Application No. 2017200371.
Australian Examination Report dated May 2, 2018, for Australian Patent Application No. 2017200371.
Canadian Office Action in related application CA 2,955,754 dated Jul. 17, 2018.
A23 System; 14Ah Prismatic Pouch Cell; Nanophosphate® Lithium-Ion; www.a123systems.com; date unknown; 1 page.
Streicher Load/Torque Cell Systems; date unknown; 1 page.
3PS, Inc.; Enhanced Torque and Tension Sub with Integrated Turns; date unknown; 2 total pages.
Lefevre, et al.; Drilling Technology; Deeper, more deviated wells push development of smart drill stem rotary shouldered connections; dated 2008; 2 total pages.
PCT Invitaiton to Pay Additional Fees for International Application No. PCT/US2008/086699; dated Sep. 9, 2009; 7 total pages.
PCT Notification of Transmittal of the International Search Report and the Written Opinion of the International Searching Authority for International Application No. PCT/US2008/086699; dated Sep. 11, 2009; 19 total pages.
National Oilwell Varco; Rotary Shoulder Handbook; dated 2010; 116 total pages.
Weatherford; TorkSub™ Stand-Alone Torque Measuring System; dated 2011-2014; 4 total pages.
Australian Examination Report for Application No. 2008334992; dated Apr. 5, 2011; 2 total pages.
European Search Report for Application No. 08 860 261.0-2315; dated Apr. 12, 2011; 4 total pages.
Eaton; Spool Valve Hydraulic Motors; dated Sep. 2011; 16 total pages.
European Extended Search Report for Application No. 12153779.9-2315; dated Apr. 5, 2012; 4 total pages.
Australian Examination Report for Application No. 2012201644; dated May 15, 2013; 3 total pages.
Warrior; 250E Electric Top Drive (250-TON); 250H Hydraulic Top Drive (250-TON); dated Apr. 2014; 4 total pages.
Hydraulic Pumps & Motors; Fundamentals of Hydraulic Motors; dated Jun. 26, 2014; 6 total pages.
Warrior; Move Pipe Better; 500E Electric Top Drive (500 ton-1000 hp); dated May 2015; 4 total pages.
Canadian Office Action for Application No. 2,837,581; dated Aug. 24, 2015; 3 total pages.
European Extended Search Report for Application No. 15166062.8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.
PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.

(56) References Cited

OTHER PUBLICATIONS

Australian Examination Report for Application No. 2017200371; dated May 2, 2018; 4 total pages.
Canadian Office Action for Application No. 2,974,298; dated May 16, 2018; 3 total pages.
European Patent Office; Extended European Search Report for Application No. 18157915.2; dated Jun. 6, 2018; 8 total pages.

* cited by examiner

POWER SUPPLY FOR A TOP DRIVE

BACKGROUND

Field

Embodiments of the present disclosure generally relate to apparatus and methods for tool unit power supply during a well operation. More particularly, the present disclosure relates to apparatus and method for non-hydraulic power supply to a tool unit from a top drive.

Description of the Related Art

During a well operation, various tool units (e.g., drilling tool unit, casing tool unit, cementing tool unit, etc.) are used with a top drive. A top drive almost always provides a power supply to the tool units for communication, identification, sensing, measuring, or actuating components. Typically, a wellbore is first formed to access hydrocarbon-bearing formations (e.g., crude oil and/or natural gas) by drilling. Drilling is accomplished by utilizing a drill bit that is mounted on the end of a drill string. To drill to a predetermined depth, the drill string is connected to a top drive on a surface rig via a drilling tool unit and is rotated by the top drive. After drilling to the predetermined depth, the drilling tool unit, drill string, and drill bit are disconnected from the top drive. A casing tool unit is then attached to the top drive to lower a section of casing into the wellbore. An annulus is thus formed between the casing string and the formation. The casing string may then be hung from the wellhead. The casing tool unit may then be replaced by a cementing tool unit to conduct a cementing operation to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

On some tool units, for example, the casing tool unit, hydraulic energy is typically coupled to the tool unit to provide power for operational activities. However, hydraulic components (such hydraulic power unit, hydraulic swivel, connectors, hoses, valves, actuators, and pressure cylinders) can cause downtimes due to maintenance and contamination due to leaks.

Therefore, there is a need for apparatus and methods for non-hydraulic power supply from the top drive to the tool units during a well operation.

SUMMARY

One embodiment of the present disclosure generally provides a top drive system that includes a top drive, a tool unit having a power consumer, and a non-hydraulic power supply selected from at least one of a mechanical power coupling from the top drive to the tool unit, a wireless power coupling from the top drive to the tool unit, a local power supply on the tool unit, and combinations thereof. The power consumer is configured to receive power from the non-hydraulic power supply, and the non-hydraulic power supply is capable of supplying at least 2 kW for at least 10 s.

One embodiment of the present disclosure generally provides a method of operating a tool unit coupled to a top drive that includes connecting a non-hydraulic power supply to a power consumer on the tool unit; powering the non-hydraulic power supply with the top drive; and supplying power to the power consumer with the non-hydraulic power supply. The power supplied is at least 2 kW for at least 10 s.

One embodiment of the present disclosure generally provides a top drive system that includes a tool unit, a top drive for rotating the tool unit, a fixed gear coupled to the top drive, a slewing ring meshed to the fixed gear, and a revolving gear meshed with the slewing ring and coupled to the tool unit. The slewing ring is configured to transfer rotational force from the fixed gear to the revolving gear.

One embodiment of the present disclosure generally provides a method that includes rotating a torque shaft of a tool unit with one or more drive motors on a top drive; actuating a fixed gear on the top drive; and rotating the slewing ring through at least one of the rotating the torque shaft and the actuating the fixed gear. The tool unit is coupled to a revolving gear that is meshed with a slewing ring.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to apparatus and methods of suppling power to a tool unit during a well operation. More particularly, the present disclosure relates to apparatus and method of supplying non-hydraulic power to a tool unit from a top drive.

A benefit amongst many provided by this disclosure allows for ready supply of power to meet short-term, high-power load demands.

Figure 1:
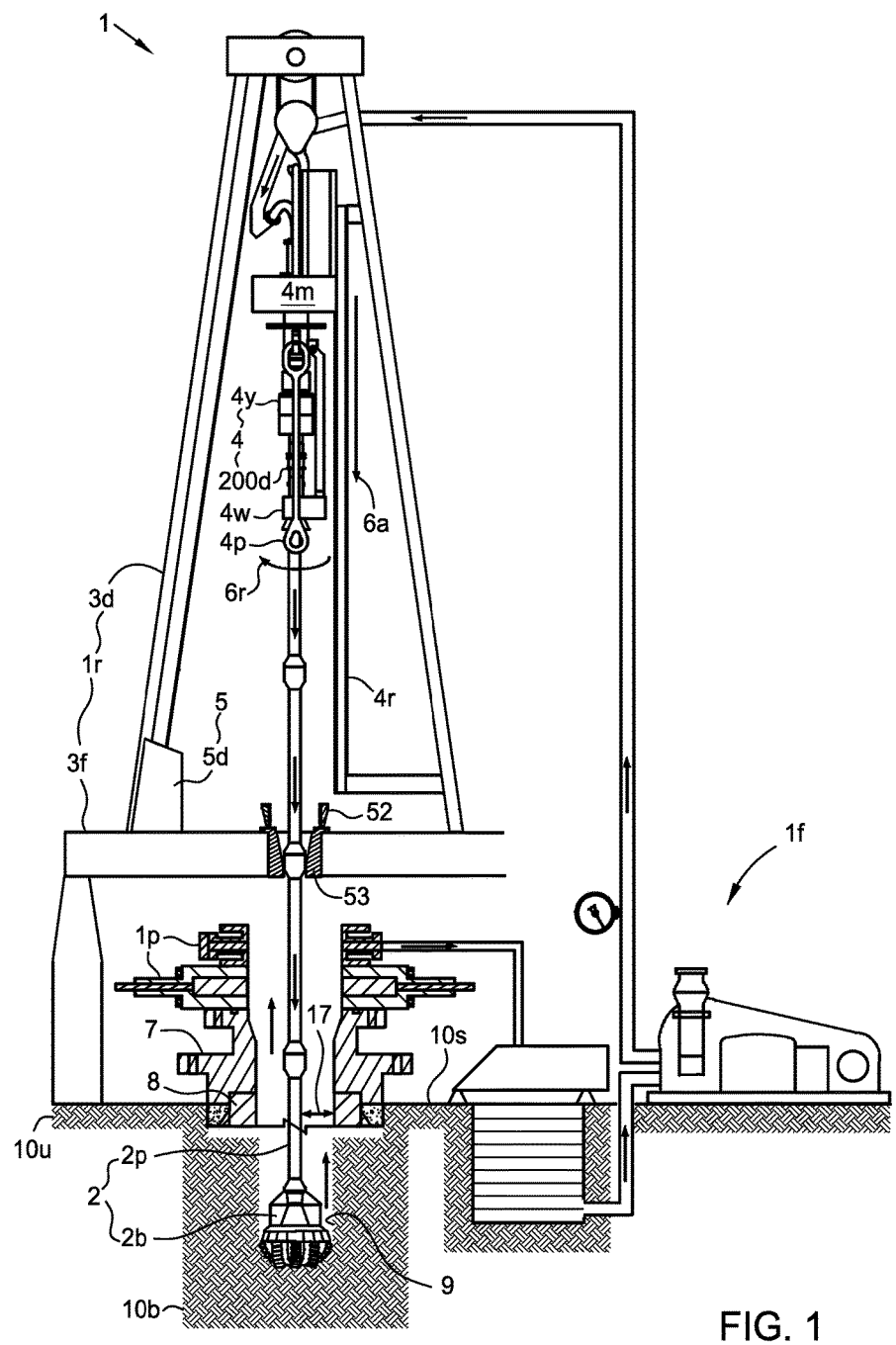
FIG. 1 illustrates a drilling system in a drilling mode, according to an embodiment of the present disclosure.

FIG. 1 illustrates a drilling system 1 in a drilling mode, according to an embodiment of the present disclosure. The drilling system 1 may include a drilling rig 1r, a fluid handling system 1f, a pressure control assembly (PCA) 1p, and a drill string 2. The drilling rig 1r may include a derrick 3d, a rig floor 3f, a top drive 4, and a hoist 5. The rig floor 3f may have an opening through which the drill string 2 extends downwardly into the PCA 1p.

The drill string 2 may include a bottomhole assembly (BHA) and a pipe string 2p. The pipe string 2p may include joints of drill pipe connected together, such as by threaded couplings. The BHA is connected to the pipe string 2p, such as by threaded couplings and a drill bit 2b. The drill bit 2b may be rotated (e.g., rotation 6r) by the top drive 4 via the pipe string 2p, and/or the BHA may further include a drilling motor (not shown) for rotating the drill bit. The BHA may further include an instrumentation sub (not shown), such as a measurement while drilling (MWD) and/or a logging while drilling (LWD) sub.

An upper end of the pipe string 2p may be connected to the top drive 4. The top drive may be a modular top drive as provided in U.S. Patent Application 62/107,599. The top drive 4 may include a control unit, a motor unit 4m, a tool unit 200 (e.g., a drilling tool unit 200d, a casing tool unit 200c (FIG. 4), a cementing tool unit, etc.), a pipe handler 4p, a backup wrench 4w, a rail 4r, and a coupling that allows tool unit 200 to dock with the top drive 4, for example, combined multi-coupler ("CMC") 4y. The coupling may be a CMC as provided in U.S. Patent Applications Nos. 62/216,843 and 62/214,310, which are hereby incorporated by reference. Alternatively, the coupling may be any suitable coupling commonly known or used in the industry. The top drive 4 may be assembled as part of the drilling rig 1r by connecting ends of the rail 4r to the derrick 3d such that a front of the rail is adjacent to a drill string opening in the rig floor 3f.

Alternatively, the top drive 4 may include twin rails instead of the monorail. Alternatively, the lower end of the rail 4r may be connected to the rig floor 3f instead of the derrick 3d.

The PCA 1p may include a blowout preventer (BOP) and a flow cross. A housing of the BOP and the flow cross may each be interconnected and/or connected to a wellhead 7, such as by a flanged connection. The wellhead 7 may be mounted on a casing string 8 which has been deployed into a wellbore 9 drilled from a surface 10s of the earth and cemented into the wellbore 9. The casing string 8 may extend to a depth adjacent a bottom of an upper formation 10u. The upper formation 10u may be non-productive and a lower formation 10b may be a hydrocarbon-bearing reservoir.

Alternatively, the lower formation 10b may be non-productive (e.g., a depleted zone), environmentally sensitive, such as an aquifer, or unstable. Alternatively, the wellbore 9 may be subsea having a wellhead located adjacent to the waterline and the drilling rig 1r may be a located on a platform adjacent the wellhead. Alternatively, the wellbore 9 may be subsea having a wellhead located adjacent to the seafloor and the drilling rig 1r may be a located on an offshore drilling system.

During drilling of the wellbore 9, once a top of the drill string 2 reaches the rig floor 3f, the drill string may be extended to continue drilling. Drilling may be halted by stopping rotation 6r of the motor unit 4m and removing weight from the drill bit 2b. A spider 52 may then be installed into a rotary table 53, thereby longitudinally supporting the drill string 2 from the rig floor 3f. The tong actuator of the backup wrench 4w may be operated to engage the backup wrench tong with a top coupling of the drill string 2.

As would be understood by one of ordinary skill in the art with the benefit of this disclosure, each of the tool units 200 may have a variety of power consuming components. Such power consumers require power for certain activities during operations. Exemplary power consumers include a variety of sensors (e.g., rotation sensors, slip open/set sensors, etc.), data collectors/communicators (e.g., counters, antenna, etc.), or other components (e.g., active identification devices 222) that typically require a low level of power (e.g., about 2 W-about 20 W). Certain activities conducted by exemplary power consumers may require additional power (e.g., about 20 W-about 1 kW), for example, for a drilling tool unit 200d to actuate an internal blowout preventer (IBOP), or for a cementing tool unit to actuate a launcher. Additional power may be stored by one or more energy buffers on tool unit 200 (e.g., battery charging. Even higher power loads (e.g., about 1 kW-about 20 kW) may be required for certain activities conducted by exemplary power consumers, such as actuation of slips 57s by casing tool unit 200c. For example, higher power loads may be required for between about 1 s and about 30 s. In some embodiments, the power load may be at least about 2 kW for at least about 10 s. The top drive 4 may supply power to power consumers of the tool units 200 through one or more of several non-hydraulic power supplies, including wireless power coupling (e.g., inductive coupling), mechanical power coupling (e.g., drive axle), and local (on the tool unit) power supply (e.g., energy buffer). The top drive 4 powers the non-hydraulic power supplies, which then supply power to the power consumers. At times, power consumers on the tool units 200 may be supplied power contemporaneously both from the local power supply and from at least one of a mechanical power coupling and a wireless power coupling from the top drive. Appropriate selection and combination of such systems can meet operational power needs that may vary by peak load demand, steady-state load demand, time of load, power level control, and time to reach peak.

Figure 2A:
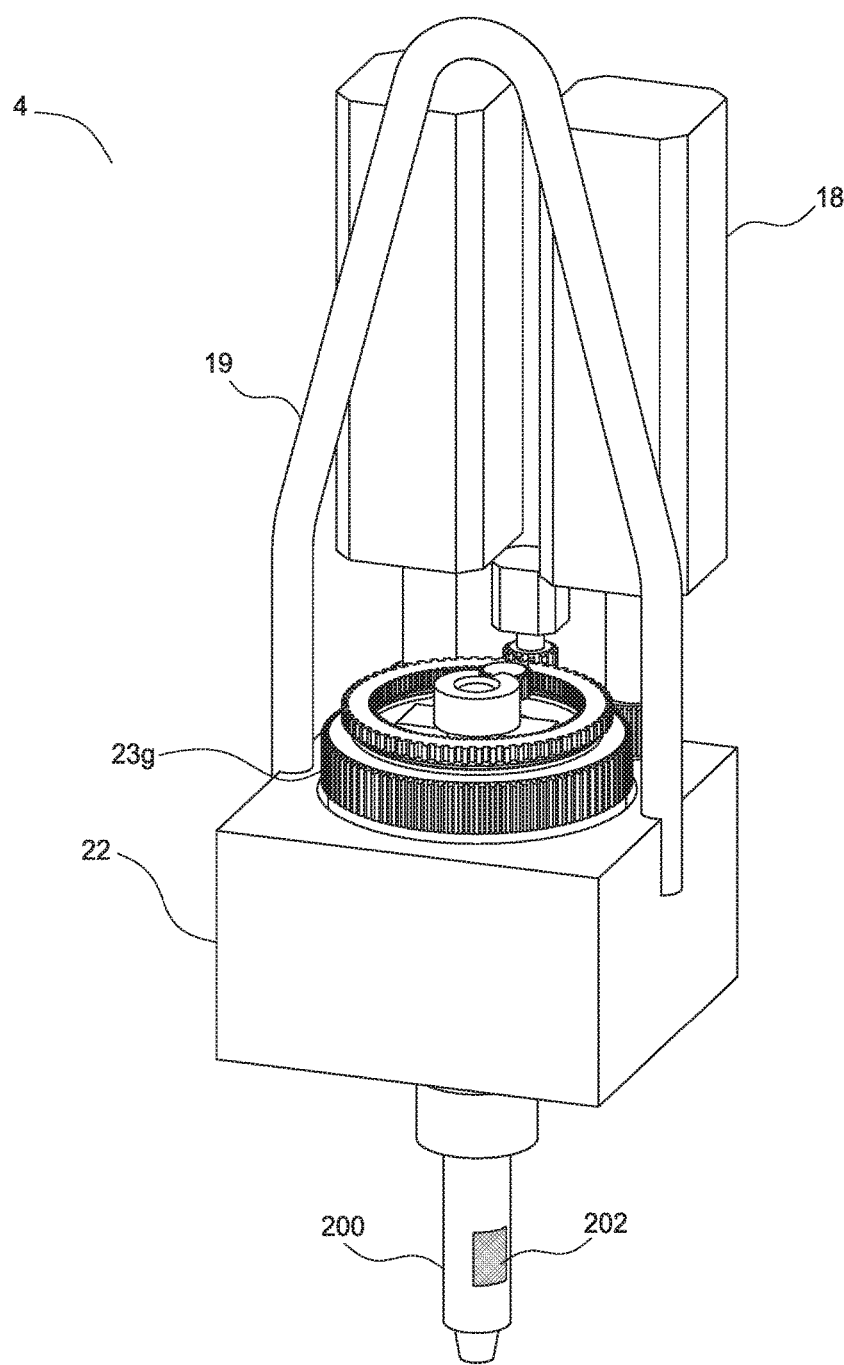
FIG. 2A illustrates a top drive of the drilling system.

FIG. 2A illustrates the top drive 4 coupled with tool unit 200. The top drive 4 may include one or more (pair shown) drive motors 18, a becket 19, a drive body 22, and a drive ring, such as torque drive gear 23g. The drive body 22 may be rectangular, may have a thrust chamber formed therein, and may have a central opening formed therethrough. The drive motors 18 may be electric (shown) or hydraulic (not shown) and have a rotor and a stator. A stator of each drive motor 18 may be connected to the drive body 22, such as by fastening. The rotor of each drive motor 18 may be torsionally connected to the torque drive gear 23g for rotation (e.g., rotation 6r in FIG. 1) thereof. Alternatively, top drive 4 may instead have a direct drive unit having the drive motor 18 centrally located.

Figure 2B:
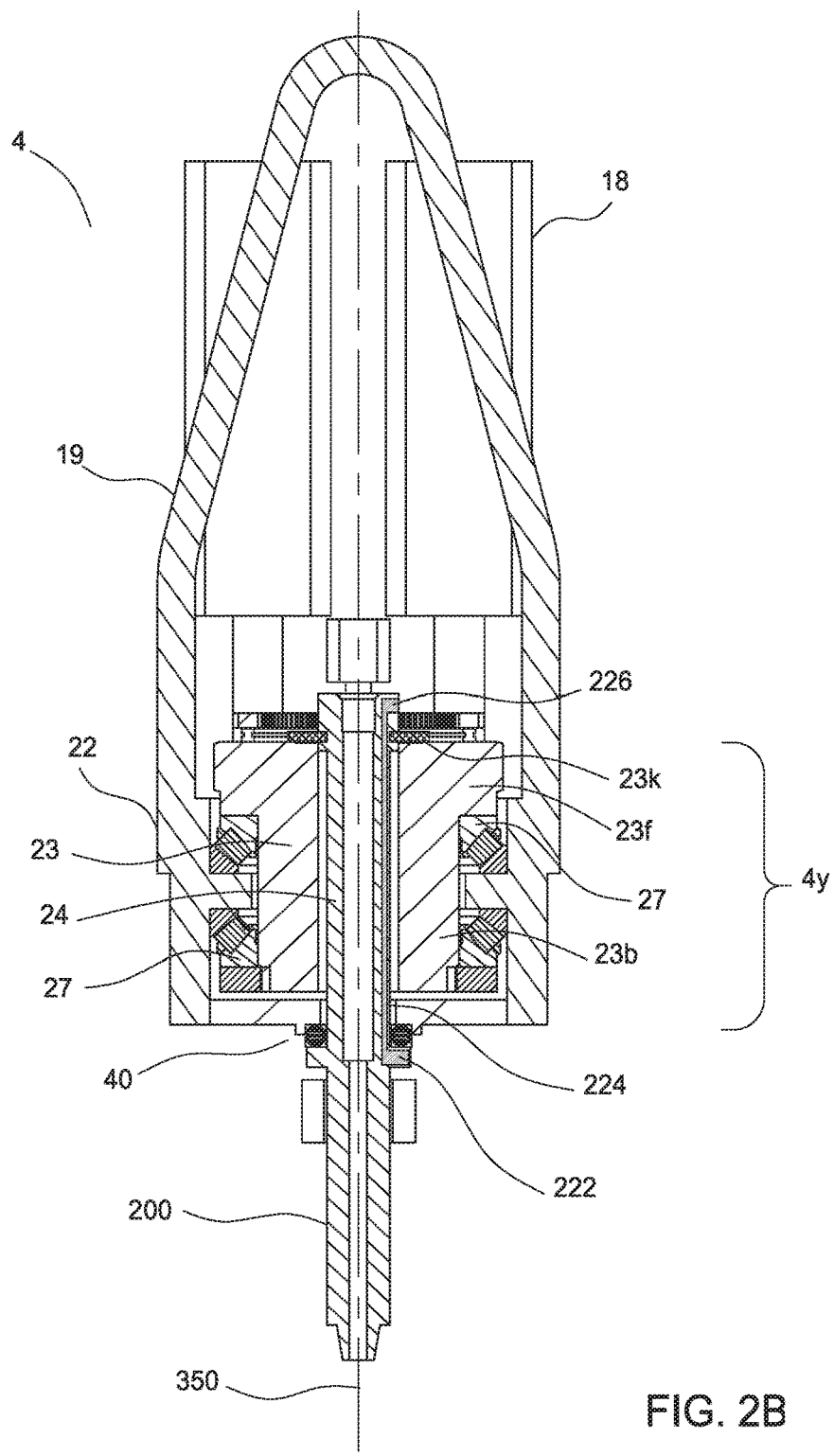
FIG. 2B illustrates components of a combined multi-coupler in a cross-sectional view of the top drive.

FIG. 2B illustrates components of a CMC 4y in a cross-sectional view of the top drive 4. The CMC 4y may include a torque drive body 23 and a tool dock 24. The torque drive body 23 may be cylindrical, may have a bore therethrough, may have a flange 23f formed in an upper end thereof, may have a bayonet profile 23b formed adjacently below the flange 23f, and may rotationally couple to the drive body 22 via one or more bearings 27. The tool dock 24 may be configured to be coaxially inserted in, and latch to, torque drive body 23. For example, torque drive body 23 may have a locking mechanism 23k that can selectively lock the tool dock 24 within the bore. Torque drive body 23 may share a central axis 350 with tool dock 24. The tool dock 24 may be configured to couple to a tool unit 200, thereby conveying torque from torque drive body 23 to the tool unit 200. In some embodiments, the tool dock 24 is an integral structure of the tool unit 200. Attaching the tool dock 24 to the CMC 4y couples the top drive 4 to the tool unit 200, thereby allowing selective transfer of torque from the top drive 4 to the tool unit 200. In some embodiments, a torque sub 40 may be located on the tool dock 24, adjacent to a stationary portion of the drive body 22, such as the location illustrated in FIG. 2B.

In one embodiment, the tool unit 200 may be equipped with an identification device 202, as shown in FIG. 2A. The identification device 202 may be attached to an outer surface of the tool unit 200, for example by adhesives. Alternatively, the identification device 202 may be disposed in a recessed space for secure attachment. Alternatively, the identification device 202 may be embedded inside the tool unit 200 when the identification device 202 does not require direct line of sight to interact with a corresponding identification reader, for example on CMC 4y of top drive 4. Alternatively, identification device 202 may be integrated to tool unit 200, for example by etching, carving, painting, printing, layer buildup, molding, etc. The identification device 202 may be an identification device as provided in U.S. Patent Application No. 62/203,712, which is hereby incorporated by reference.

The identification device 202 is disposed on the tool dock 24 of the tool unit 200 in FIG. 2A. Alternatively, the identification device 202 may be disposed in any suitable locations on the tool unit 200. In an embodiment, the tool unit 200 may include two or more identification devices 202 positioned at various locations.

The identification device 202 may be a radio frequency identification device (RFID), such as a RFID tag or a RFID chip. In an embodiment, the RFID includes preloaded information and data for automatic identification. Preloaded information and data in the RFID may be read by a RFID reader nearby. The RFID may be read by a RFID reader without requiring a direct line of sight.

In an embodiment, the identification device 202 may be a passive (non-powered) RFID that does not include or is not connected to an electrical power source. The passive RFID may collect energy from interrogating radio waves from a reader nearby and act as a passive transponder to send preloaded information and data to the reader. The identification device 202 of FIG. 2A is a passive device without a power source. Passive identification devices are easy to maintain and may be read anywhere.

As illustrated in FIG. 2B, the identification device may be an active (powered) identification device 222. In an embodiment, the active identification device 222 may include an energy buffer, such as a battery, a supercapacitor, or a pressure reservoir. Alternatively, the active identification device 222 may include electrical circuits for receiving external power. As shown in FIG. 2B, the tool unit 200 may include one or more conductive pads 226 formed on an exterior surface of tool dock 24. Each conductive pad 226 may be connected to the active identification device 222 by a wire 224. The one or more conductive pads 226 may be configured to form electrical connection with an external power supply, for example, a power output of the top drive 4. In another embodiment, a wireless power coupling (between the top drive 4 and the tool unit 200) may be used to power the active identification device 222. In another embodiment, a mechanical power coupling (between the top drive 4 and the tool unit 200) may be used to power the active identification device 222. Alternatively, the active identification device 222 may include an internal power source. For example, the active identification device 222 may include an electric generator, such as a hydraulic generator that generates electrical power by hydraulics. In another embodiment, some of one or more conductive pads 226 may be adapted to connect with an interface of top drive 4 to transmit signals between the active identification device 222 and the external unit. For example, some of one or more conductive pads 226 may be adapted to connect with an interface on CMC 4y of top drive 4.

In an embodiment, the one or more conductive pads 226 may be positioned on external surfaces of the tool dock 24 so that the active identification device 222 may be activated by the top drive 4 during operation. In one embodiment, the one or more conductive pads 226 and the wire 224 may be electrically insulated from the tool dock 24.

Figure 3:
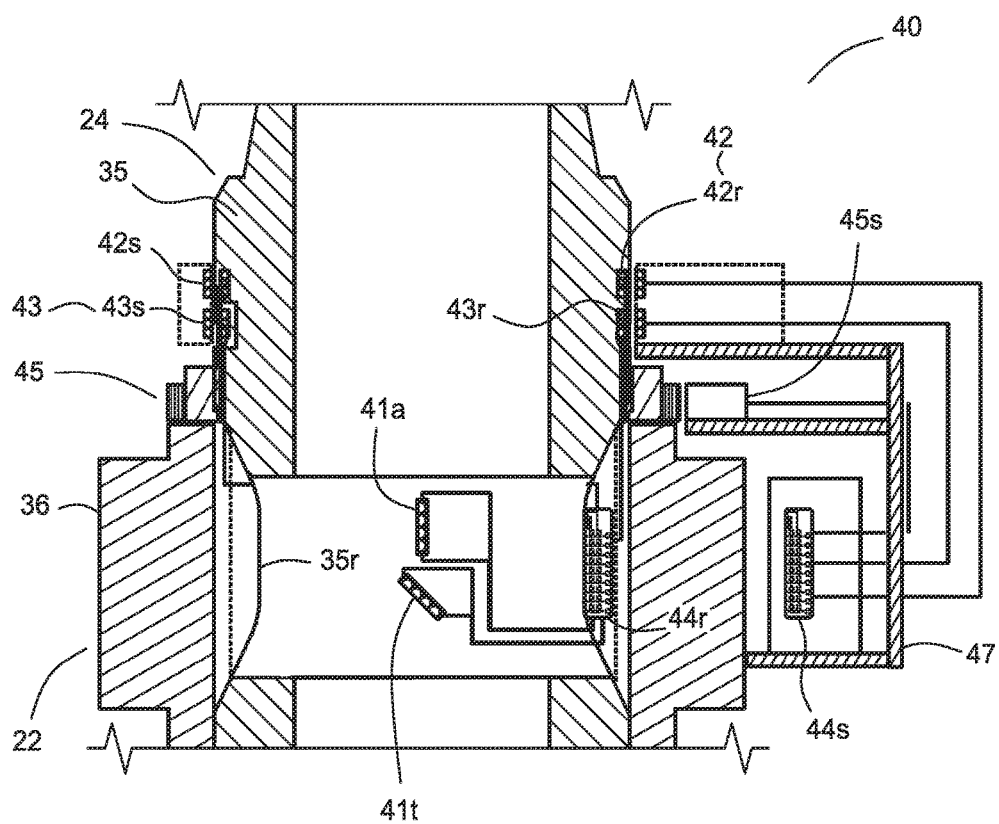
FIG. 3 illustrates the torque sub from FIG. 2B, the torque sub having a wireless power coupling.

In some embodiments, a torque sub may be provided on the tool unit 200 such as on the tool dock 24. FIG. 3 illustrates an embodiment of a torque sub 40. The torque sub 40 may be generally located on a rotatable portion of the tool unit 200, such as the tool dock 24, adjacent to a stationary portion of the drive body 22. As illustrated, the torque shaft 35 is attached to the tool dock 24, and a non-rotating control swivel 36 is positioned on the drive body 22, adjacent to the torque shaft 35. The torque sub may include a recess 35r of the torque shaft 35, one or more load cells 41a,t, one or more wireless couplings, such as a wireless power coupling 42 and a wireless data coupling 43, a shaft electronics package 44r, a turns counter 45, a non-rotating interface box 47, and an interface electronics package 44s. The interface box 47 may be connected to a non-rotating outer barrel of the control swivel 36, such as by fastening. The load cell 41t may include a circuit of one or more torsional strain gages and the load cell 41a may include a circuit of one or more longitudinal strain gages, each strain gage attached to the recess of the torque shaft 35, such as by adhesive.

Each wireless coupling 42, 43 may include a shaft member 42r, 43r connected to the torque shaft 35 and an interface member 42s, 43s housed in an encapsulation on the interface box 47. The wireless power coupling members 42r,s may each be inductive coils and the wireless data coupling members 43r,s may each be antennas. The shaft electronics may be connected by leads, and the shaft electronics package 44r, load cells 41a,t, and the wireless data coupling shaft member 43r may be encapsulated into the recess.

Figure 9A:
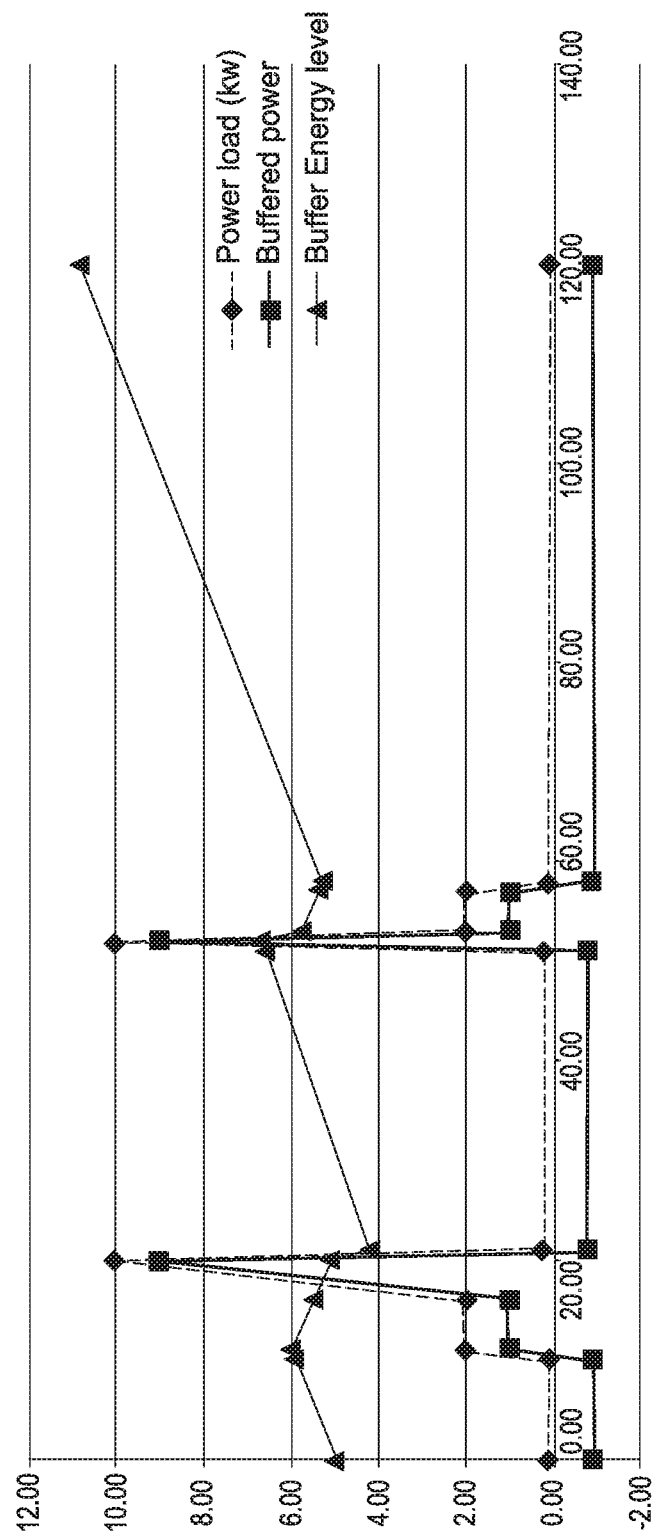
FIG. 9A illustrates an example power cycle during slip actuation.
Figure 9B:
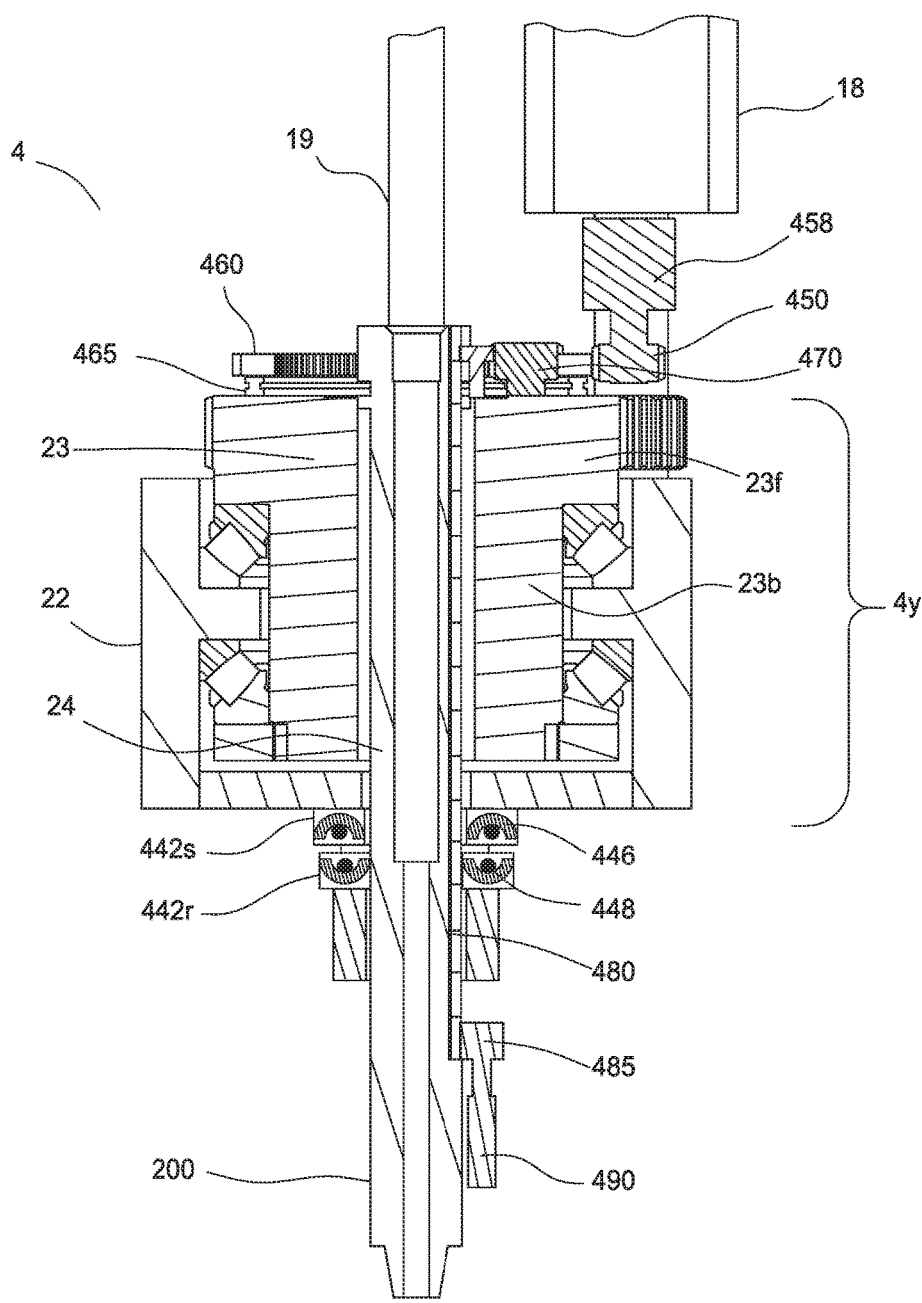
FIG. 9B illustrates a tool unit with a mechanical power coupling, a wireless power coupling, and a local power supply.

Alternatively, an energy buffer may be disposed on tool unit 200 (for example, local power supply 490 in FIG. 9B). The energy buffer may be a battery, a supercapacitor, or a pressure reservoir, and the wireless power coupling 42 may be omitted or used only to charge the energy buffer.

Figure 4:
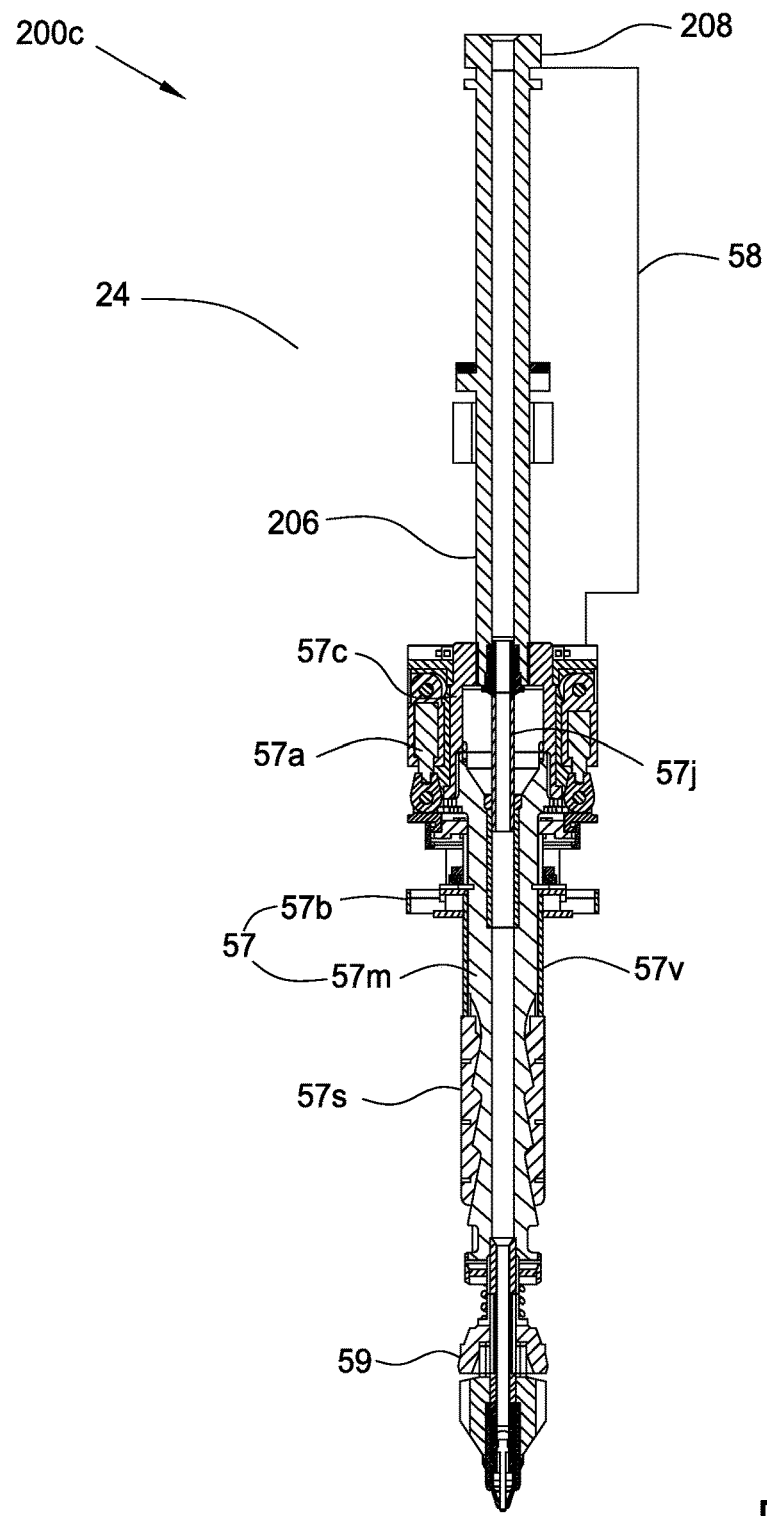
FIG. 4 illustrates a casing tool unit, according to an embodiment of the present disclosure.

FIG. 4 illustrates an exemplary casing tool unit 200c suitable for connection to the CMC 4y. The casing tool unit 200c may include a tool dock 24, a clamp, such as a spear 57 for gripping the casing string 8 (FIG. 5), one or more control lines 58, and a fill-up tool 59. The tool dock 24 may include a trunk 206 and a head 208. The tool dock 24 may be integrated with the spear 57 or coupled to the spear 57 using a connection such as a thread coupling. The spear 57 and fill-up tool 59 may be connected together, such as by threaded couplings or otherwise to transfer torsional force.

Figure 5:
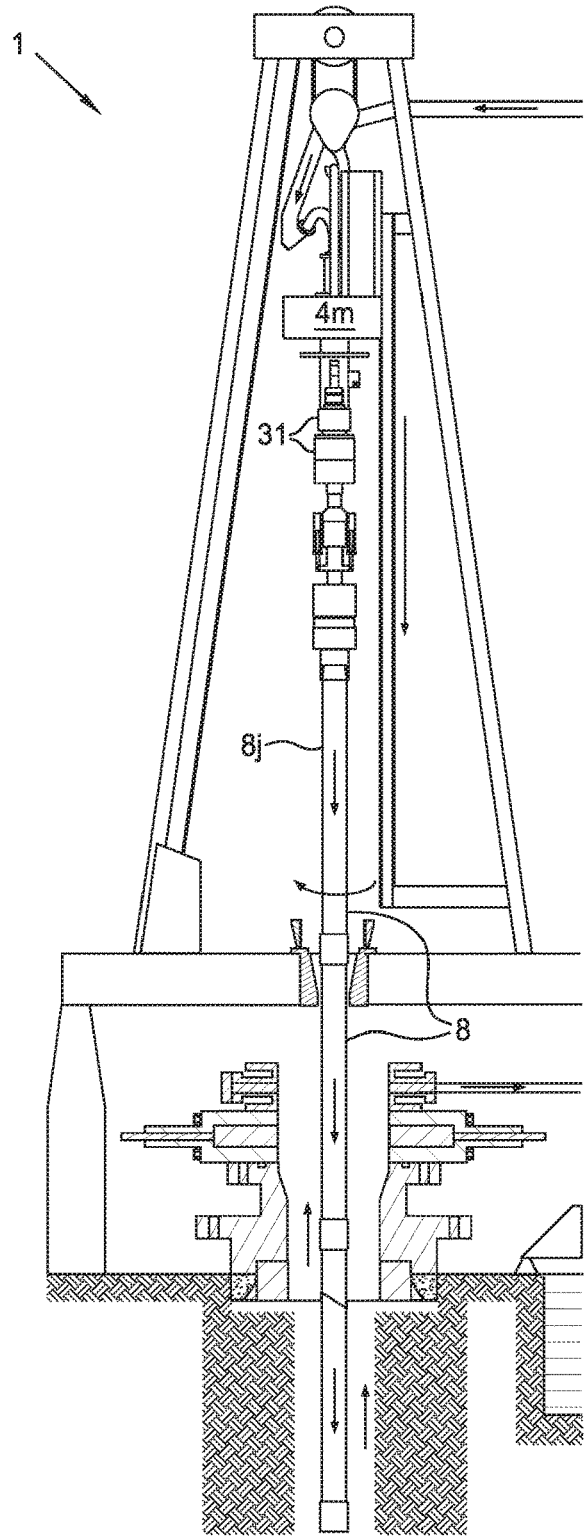
FIG. 5 illustrates the drilling system in a casing mode.

The spear 57 of the casing tool unit 200c may be capable of supporting weight of the casing string 8 (FIG. 5). As illustrated in FIG. 4, the spear 57 may include a linear actuator 57a, a bumper 57b, a collar 57c, a mandrel 57m, a set of grippers, such as slips 57s, a seal joint 57j, and a sleeve 57v. The collar 57c may be integrated with the tool dock 24, or alternatively threaded to the tool dock 24. The collar lower thread may be engaged with an outer thread formed at an upper end of the mandrel 57m and the mandrel may have an outer flange formed adjacent to the upper thread and engaged with a bottom of the collar 57c, thereby connecting the two members.

The seal joint 57j may include an inner barrel, an outer barrel, and a nut. The upper portion of the inner barrel is sealingly engaged with the lower end of the tool dock 24, and the lower portion is coupled to the upper portion of the outer barrel. The lower portion of the outer barrel may be disposed in the recessed portion of the mandrel 57m and trapped therein by engagement of an outer thread of the nut. The outer barrel may have a seal bore formed therethrough and a lower portion of the inner barrel may be disposed therein and carry a stab seal engaged therewith.

The sleeve 57v may have an outer shoulder formed in an upper end thereof trapped between upper and lower retainers. A washer may have an inner shoulder formed in a lower end thereof engaged with a bottom of the lower retainer. The washer may be connected to the lower flange, such as by fastening, thereby longitudinally connecting the sleeve 57v to the linear actuator 57a. The sleeve 57v may also have one or more (pair shown) slots formed through a wall thereof at an upper portion thereof. The bumper 57b may be connected to the mandrel 57m, such as by one or more threaded fasteners, each fastener extending through a hole thereof, through a respective slot of the sleeve 57v, and into a respective threaded socket formed in an outer surface of the mandrel, thereby also torsionally connecting the sleeve to the mandrel while allowing limited longitudinal movement of the sleeve relative to the mandrel to accommodate operation of the slips 57s. A lower portion of the spear 57 may be stabbed into the casing joint 8j until the bumper 57b engages a top of the casing joint. The bumper 57b may cushion impact with the top of the casing joint 8j to avoid damage thereto.

As illustrated in FIG. 4, the sleeve 57v may extend along the outer surface of the mandrel from the lower flange of the linear actuator 57a to the slips 57s. A lower end of the sleeve 57v may be connected to upper portions of each of the slips 57s, such as by a flanged (i.e., T-flange and T-slot) connection. Each slip 57s may be radially movable between an extended position and a retracted position by longitudinal movement of the sleeve 57v relative to the slips. A slip receptacle may be formed in an outer surface of the mandrel 57m for receiving the slips 57s. The slip receptacle may include a pocket for each slip 57s, each pocket receiving a lower portion of the respective slip. The mandrel 57m may be connected to lower portions of the slips 57s by reception thereof in the pockets. Each slip pocket may have one or more (three shown) inclined surfaces formed in the outer surface of the mandrel 57m for extension of the respective slip. A lower portion of each slip 57s may have one or more (three shown) inclined inner surfaces corresponding to the inclined slip pocket surfaces.

Downward movement of the sleeve 57v toward the slips 57s may push the slips along the inclined surfaces, thereby wedging the slips toward the extended position. The lower portion of each slip 57s may also have a guide profile, such as tabs, extending from sides thereof. Each slip pocket may also have a mating guide profile, such as grooves, for retracting the slips 57s when the sleeve 57v moves upward away from the slips. Each slip 57s may have teeth formed along an outer surface thereof. The teeth may be made from a hard material, such as tool steel, ceramic, or cement for engaging and penetrating an inner surface of the casing joint 8j, thereby anchoring the spear 57 to the casing joint.

Figure 6A:
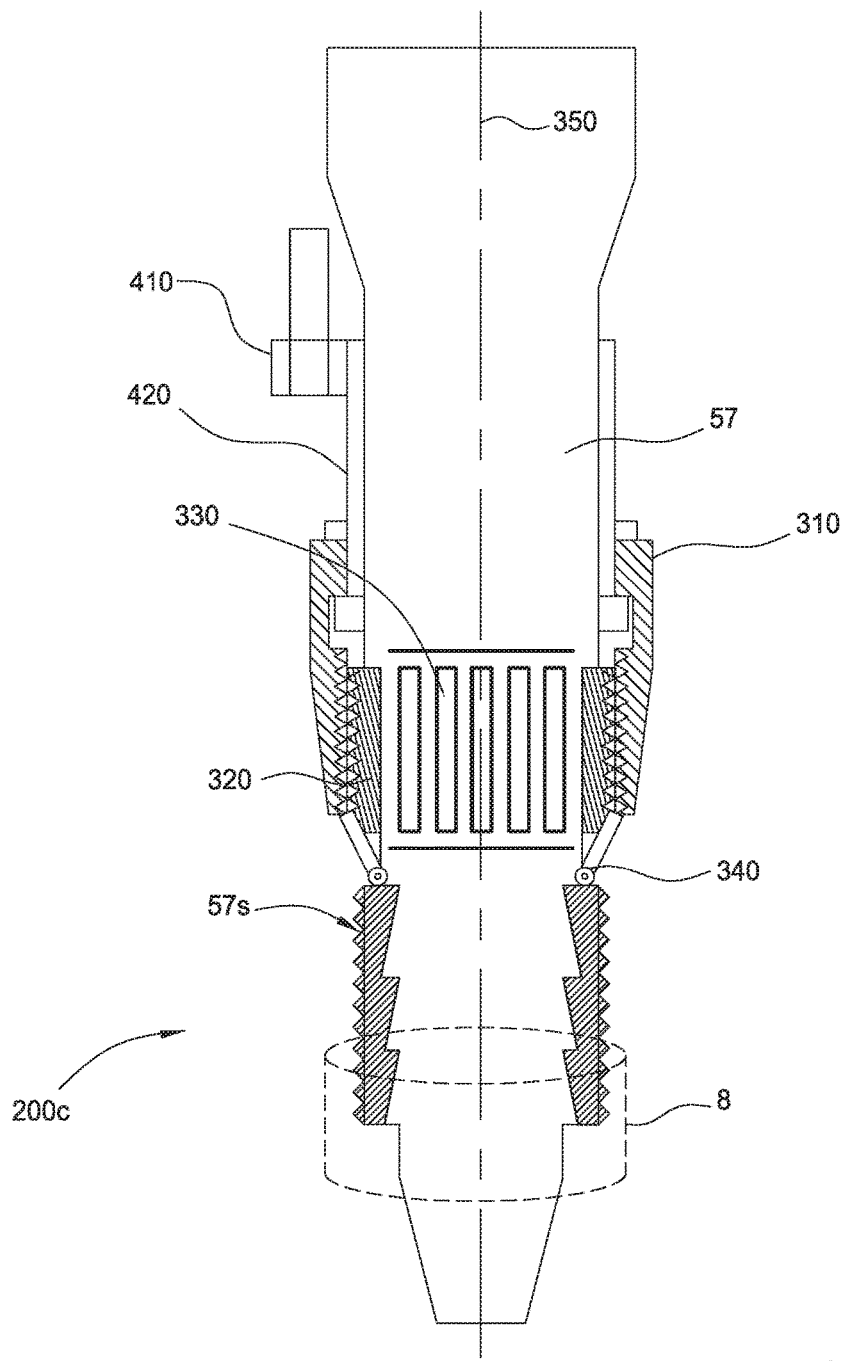
FIG. 6A,B,C illustrate slip actuation by a casing tool unit, according to an embodiment of the present disclosure.
Figure 6B:
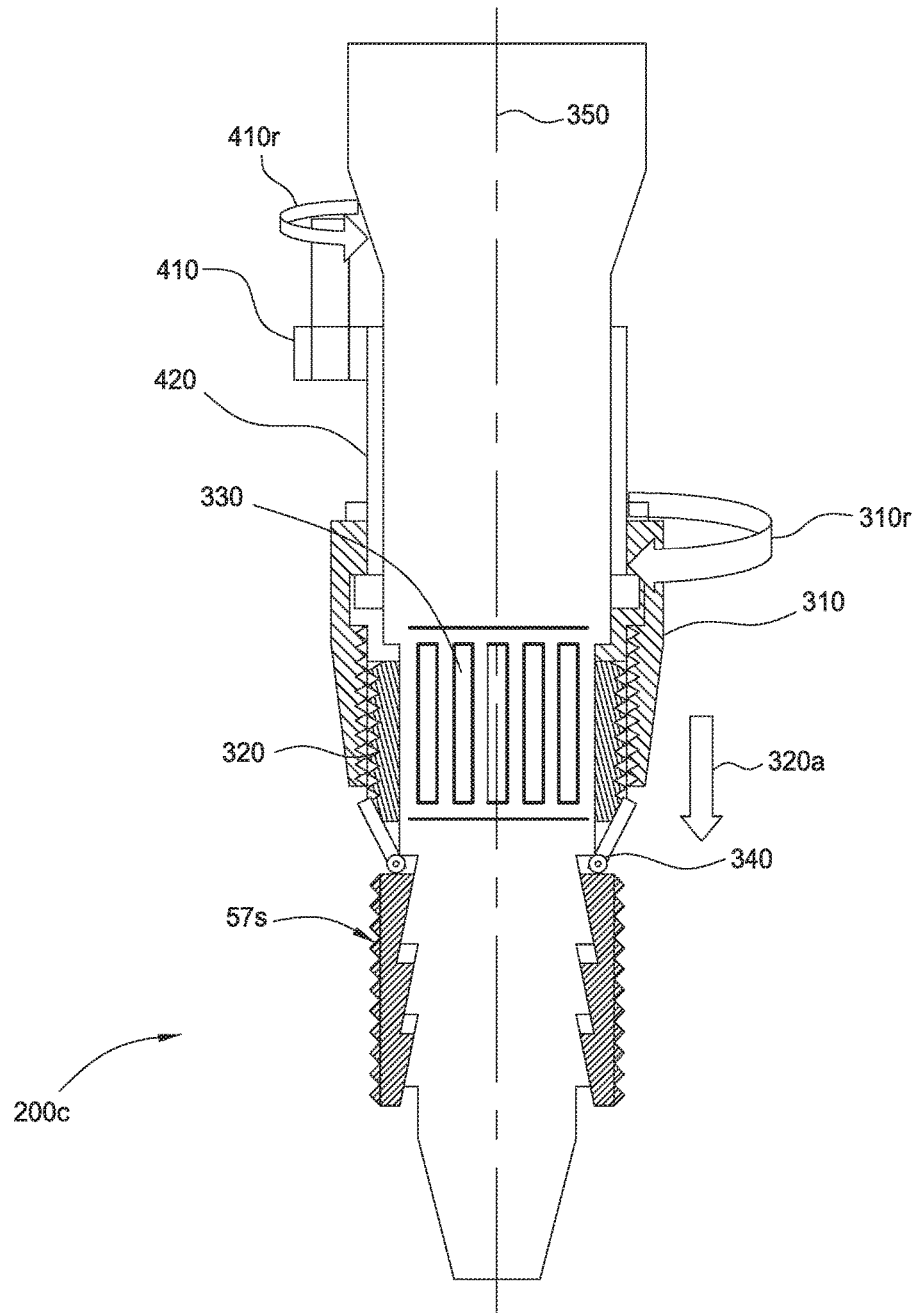
Figure 6C:
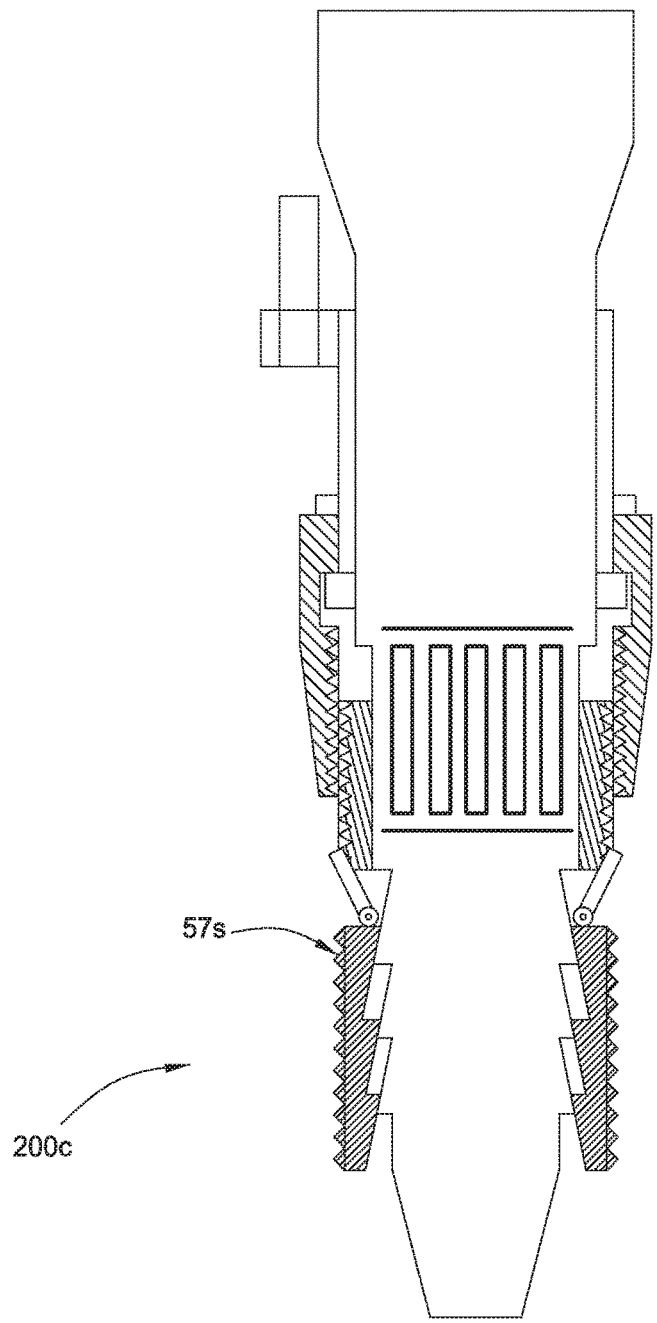

FIGS. 6A-6C illustrate an embodiment of casing tool unit 200c powered by one or more of a mechanical power coupling, a wireless power coupling, or a local power supply. FIG. 6A illustrates the slips fully retracted, e.g., disengaged with the casing string 8. As illustrated, the casing tool unit 200c includes a drive gear 410 coupled to the spear 57 of the casing tool unit 200c, though other configurations may include drive gear 410 coupled to tool dock 24, for example on trunk 206. In one embodiment, the drive gear 410 may be rotated by a local motor powered by one or more of a mechanical power coupling from the top drive, a wireless power coupling from the top drive, or a local power supply. In another embodiment, the drive gear 410 may be rotated by a mechanical power coupling from the top drive. The drive gear 410 is configured to transfer rotational force, thereby supplying power, to driven gear 310. In this embodiment, the drive gear 410 may rotate 310r the driven gear 310 by the use of one or more connectors 420. Exemplary connectors 420 may be a drive axle, a grooved sleeve, a set of gears, axles, and/or sleeves, or any other suitable connector that is capable of meshing with drive gear 410, meshing with driven gear 310, and transferring rotational force from drive gear 410 to driven gear 310. Rotation 310r of driven gear 310 about the central axis 350 of casing tool unit 200c may exert a force on an actuation nut 320, for example, via internal threading (e.g., stub acme) of the driven gear 310 with external threading of the actuation nut 320. The internal surface of the actuation nut 320 is coupled to vertical guides 330 on the spear mandrel, which prevents the actuation nut 320 from rotating relative to the spear mandrel. In this respect, rotation of the driven gear 310 causes translation 320a (e.g., lowering or raising) of the actuation nut 320 along the central axis 350. The actuation nut 320 is configured to actuate the slips 57s between an extended position and a retracted position. In the illustrated embodiment, the actuation nut 320 is coupled to the slips 57s via a slot-pin mechanism 340. One end of the pin is coupled to the actuation nut 320, and the other end of the pin is movable in a slot formed in the slips 57s. Downward force by actuation nut 320 on slot-pin mechanism 340 pushes slips 57s along the inclined surfaces of the mandrel, thereby wedging the slips 57s toward the extended position.

In operation, the spear 57 may be inserted into a casing 8 with the slips 57s in the retracted position, as shown in FIG. 6A. To extend the slips 57s into engagement with the casing 8, the drive gear 410 is rotated by a local motor or a mechanical power coupling from the top drive. Rotation of the drive gear 410 rotates the connector 420, which in turn, rotates the driven gear 310. The drive gear 310 is rotated relative to the actuation nut 320, which causes downward translation of the actuation nut 320 along the vertical guides 330. The downward force is transferred to the slips 57s via the slot-pin mechanism 340, thereby urging the slips 57s to move along the inclined surfaces of the mandrel. In this manner, the slips 57s are extended radially to engage the casing 8. FIG. 6B illustrates the slips 57s being extended by the actuation nut 320. FIG. 6C illustrates the slips 57s in the extended position, e.g., engaged with the casing string 8 (FIG. 6A). In this respect, drive gear 410 acts as a power consumer when the casing tool unit 200c actuates slips 57s.

To disengage the slips 57s, the direction of rotation 310r of driven gear 310 is reversed. When the direction is reversed, the actuation nut 320 is caused to move upwardly along the vertical guides 330. In turn, the slips 57s are moved upwardly along the inclined surfaces of the mandrel to retract the slips 57s from the extended position. In this manner, the slips 57s are disengaged from the casing string 8 and returned to the retracted position as shown in FIG. 6A.

Referring back to FIG. 4, the casing tool unit 200c may include one or more sensors (not shown), such as a position sensor for the linear actuator 57a, and a position sensor for the bumper 57b. Alternatively, the linear actuator 57a may be electrically or pneumatically operated instead of hydraulically operated, and the control line 58 may be a control cable or pneumatic control line instead of a hydraulic control line.

Alternatively, the clamp may be a torque head instead of the spear 57. The torque head may be similar to the spear 57 except for receiving an upper portion of the casing joint 8j therein and having the grippers for engaging an outer surface of the casing joint instead of the inner surface of the casing joint.

FIG. 5 illustrates the drilling system 1 in a casing mode. Injection of the drilling fluid into the casing joint 8j and rotation thereof by the drive motors 18 (FIG. 2A) may allow the casing joint 8j to be reamed into the wellbore 9 (FIG. 1). Once a top of the casing joint 8j reaches the rig floor 3f (FIG. 1), another casing joint may be added to continue deployment. Deployment may be halted by stopping rotation of the motor unit 4m. The spider 52 (FIG. 1) may then be installed into the rotary table 53 (FIG. 1), thereby longitudinally supporting the casing joint 8j from the rig floor 3f. The slips 57s (FIG. 4) may be disengaged, and a unit handler may be operated to deliver an additional joint of casing to the casing tool unit 200c (FIG. 4). The top drive 4 (FIG. 2A) may then be lowered to stab the additional casing joint into the casing joint 8j. The rotary table 53 may be locked, or a backup tong (not shown) may be engaged with the top of the casing joint 8j, and the drive motors 18 may be operated to spin and tighten the threaded connection between the casing joints 8j, thereby forming the casing string 8. The spider 52 may then be released and running of the casing string 8 may continue.

When casing tool 200c is in operation, as in FIG. 6, high power loads may be required to actuate the slips 57s. In addition to bearing the weight of the casing string 8, actuating slips 57s may require overcoming friction between the interior surface of the slips 57s and the mandrel 57m, which may be exceedingly high due to the weight of the casing string 8 and/or the wedge shapes of the friction-bearing surfaces. For example, power to disengage slips 57s by rotation 310r of driven gear 310 in FIG. 6B may be in the range of hundreds of watts to tens of kilowatts for a few seconds. In some embodiments, the expected power load for actuating slips 57s may be about 1 kW-about 20 kW for from about 1 s up to about 60 s. The duration of the high power load may vary from about 1 s, to several seconds, to up to about 5 s, or up to about 10 s, or up to about 30 s, or up to about 60 s or more. In some embodiments, the expected power load may be in the range of about 5 kW-about 15 kW, or about 8 kW-about 10 kW. In some embodiments, the high power load may be at least about 2 kW, and the duration may be at least about 10 s. In normal operations, expected time between slip actuation may be no less that about 1-3 minutes.

As illustrated in FIGS. 6A-6C, top drive 4 (FIG. 2A) may satisfy power load requirements for slip actuation by supplying power using one or more of a mechanical power coupling, wireless power coupling, or a local power supply (e.g., local power supply 490 in FIG. 9B). As illustrated, drive gear 410 on an upper portion of casing tool unit 200c transfers rotational force, thereby supplying power, to driven gear 310 on a lower portion of casing tool unit 200c. A motor on top drive 4 (e.g., servo motor 458 in FIG. 7B) may directly or indirectly actuate drive gear 410. In some embodiments, a local power supply (e.g., electric generator, hydraulic pump, energy buffer) on casing tool unit 200c may supply some or all of the power required by drive gear 410. In such embodiments, the local power supply may act at times as a power consumer (e.g., when storing power in an energy buffer) and at other times as a source of local power.

In embodiments, a mechanical power coupling or a wireless power coupling from the top drive 4 may drive the local power supply 490 (FIG. 9B) on casing tool unit 200c, which may thereby provide rotation 310r of driven gear 310 during actuation of slips 57s. Additionally, the mechanical power coupling, wireless power coupling, and/or such local power supply may be connected to an energy buffer (such as a battery, a supercapacitor, or a pressure reservoir). In an embodiment, a mechanical power coupling and/or a wireless power coupling may work with one or more of an local electric generator, a local hydraulic pump, a local power supply, and an energy buffer on casing tool unit 200c to meet operational needs, for example by providing higher power, more stable power, or to distribute power load amongst the systems. Any or all of the local electric generator, local hydraulic pump, local power supply, and energy buffer on casing tool unit 200c may thereby act as power consumers.

Figure 7A:
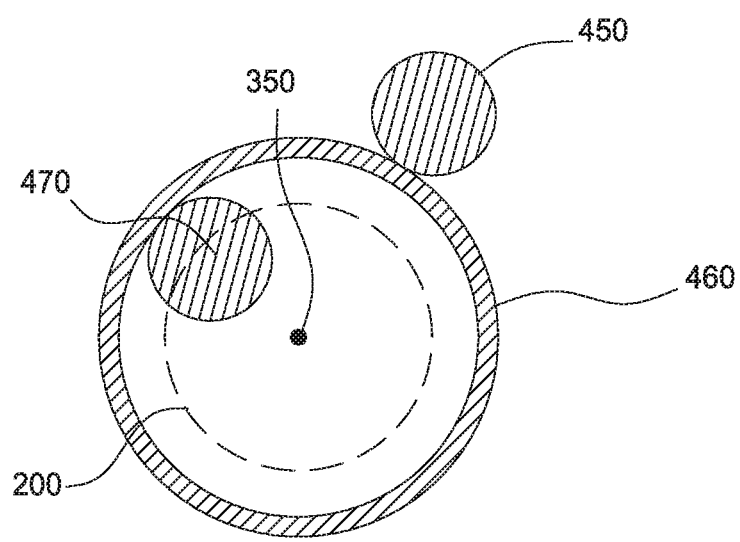
FIG. 7A,B,C,D,E illustrate a mechanical power coupling according to an embodiment of the present disclosure.

FIG. 7A illustrates an example of a mechanical power coupling from the top drive 4 to the tool unit 200. FIG. 7A is a schematic illustration of the fixed gear 450, slewing ring 460, and revolving gear 470, as seen from above tool unit 200. Revolving gear 470 is coupled to tool unit 200 so that revolving gear 470 may rotate about its own axis and revolve around the central axis 350 of tool unit 200. For example, revolving gear 470 may be disposed on top of flange 23f of torque drive body 23 (FIG. 7C,D,E). In one embodiment, revolving gear 470 may be connected as input to a power supply on tool unit 200, such as a local electric generator, a local hydraulic pump, or an energy buffer on tool unit 200. In another embodiment, revolving gear 470 may be directly coupled to a tool unit application, such as drive gear 410 in FIG. 6. Fixed gear 450 is coupled to top drive 4, possibly via drive body 22 of top drive 4. In an embodiment, drive body 22 of top drive 4 includes a servo motor 458 (FIG. 7B) capable of actuating and driving fixed gear 450 at a controllable, variable speed. Slewing ring 460 is configured to transfer rotational force from fixed gear 450 to revolving gear 470. Slewing ring 460 may rotate about central axis 350 without radial or axial translation. Slewing ring 460 may be supported on bearings or other mechanisms that reduce or eliminate friction between slewing ring 460 and either top drive 4 or tool unit 200. For example, slewing ring 460 may be connected with a low-friction coupling to CMC 4y. More particularly, slewing ring 460 may be connected with a low friction coupling to the top surface of flange 23f of torque drive body 23. While slewing ring 460 does not rotate freely, since it meshes with fixed gear 450 and revolving gear 470, the rotation of slewing ring 460 is not directly determined by the rotation of tool unit 200 relative to top drive 4. Although illustrated as having a larger radius than tool unit 200, slewing ring 460 may have a smaller, equal, or larger radius as tool unit 200.

Figure 7B:
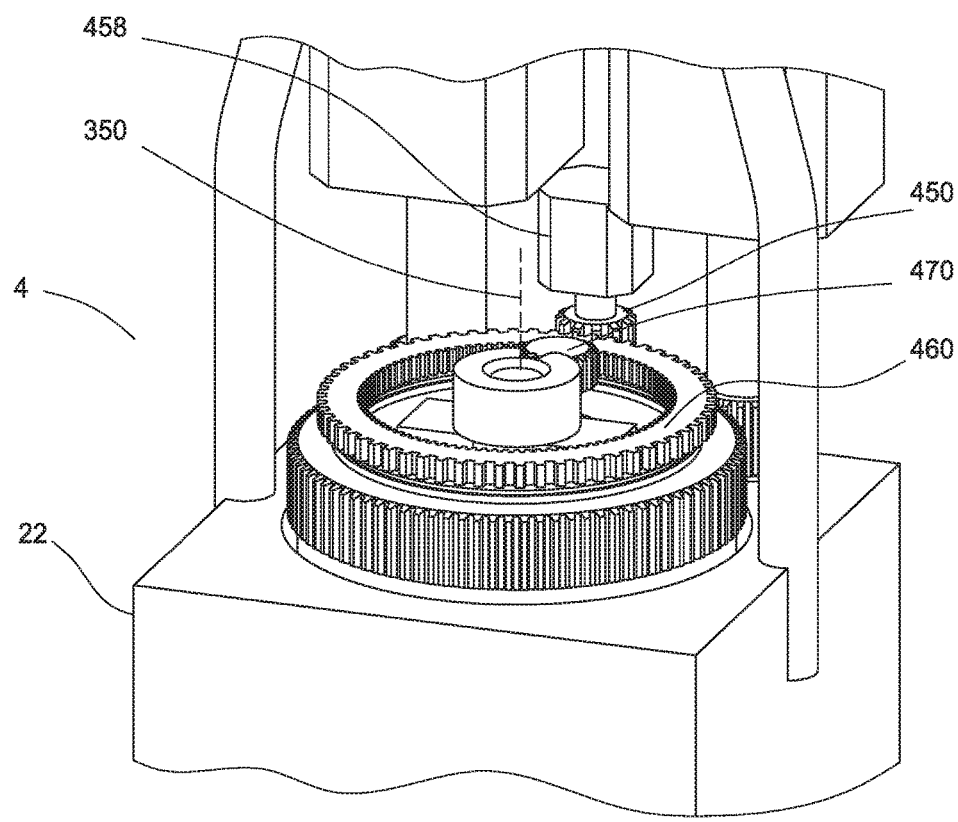
Figure 7C:
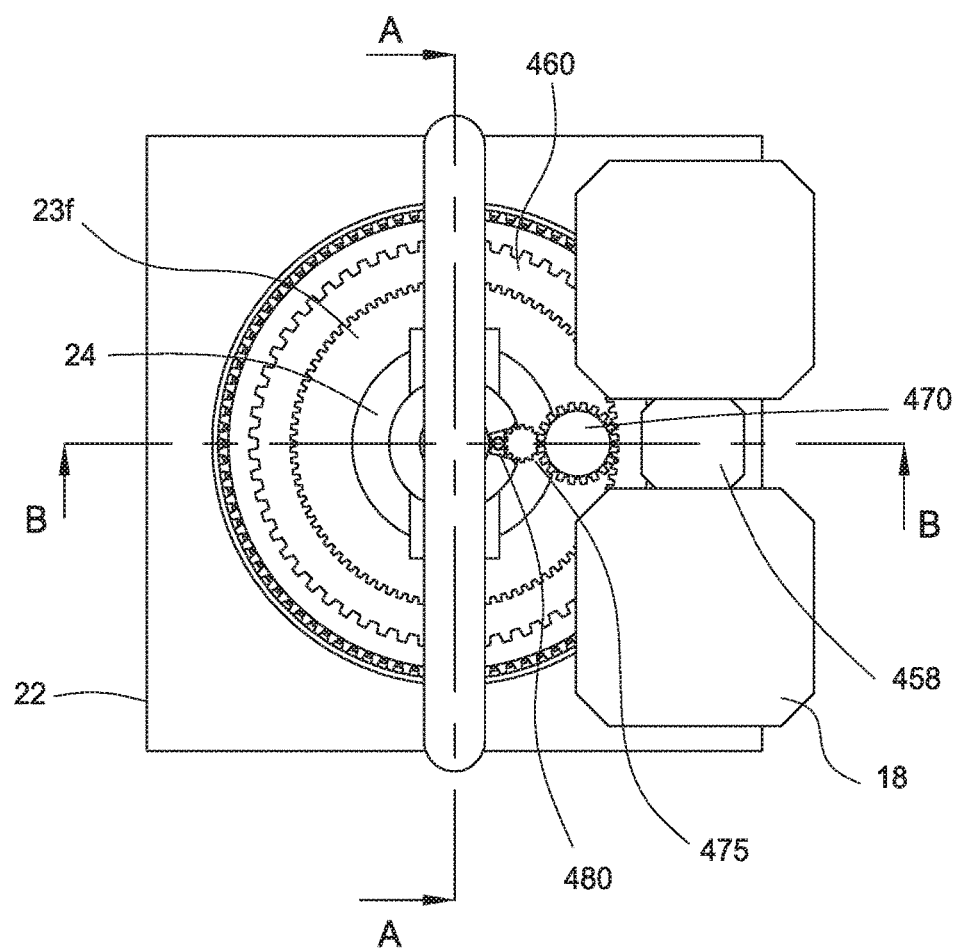

FIG. 7B illustrates an embodiment of a mechanical power coupling in context of top drive 4. During operation, torque drive body 23 rotates to provide torque to tool unit 200 and thereby to downhole tools, such as drill string 2 (FIG. 1). Revolving gear 470, which is connected on top of flange 23f of torque drive body 23, revolves about central axis 350. When fixed gear 450 is locked, for example when the servo motor 458 on the drive body 22 halts rotation of fixed gear 450, meshing of slewing ring 460 to fixed gear 450 halts rotation of slewing ring 460. Meshing of slewing ring 460 to revolving gear 470 thereby causes a rotation of revolving gear 470 as it revolves about central axis 350. Likewise, when fixed gear 450 is actuated at a certain rotational speed, for example by a servo motor 458 on drive body 22, meshing of slewing ring 460 to fixed gear 450 causes rotation of slewing ring 460 at a rotational speed that can be determined from the rotational speed of the fixed gear 450 and the gear radii of fixed gear 450 and slewing ring 460. Meshing of slewing ring 460 to revolving gear 470 thereby causes a rotation of revolving gear 470 at a further determinable rotational speed as revolving gear 470 revolves about central axis 350.

In an embodiment, a top drive 4 rotates a tool unit 200 at a speed of 250 rpm with a torque of 100.000 ft-lbf. A slewing ring 460 has a 2 ft diameter. A fixed gear 450 has a 0.2 ft diameter, and a revolving gear 470 also has a 0.2 ft diameter. When the tool unit 200 is stopped, the fixed gear 450 will rotate at 2.500 rpm. If the delivered power is assumed to be 1 kW, a torque of 1 kW/(2*Pi*250/60 s)=38.2 Nm=28.2 ft-lbf results. If the tool unit 200 is rotated, the fixed gear 450 has to speed up to 5.000 rpm or slow down to zero, depending on rotational direction.

Figure 7D:
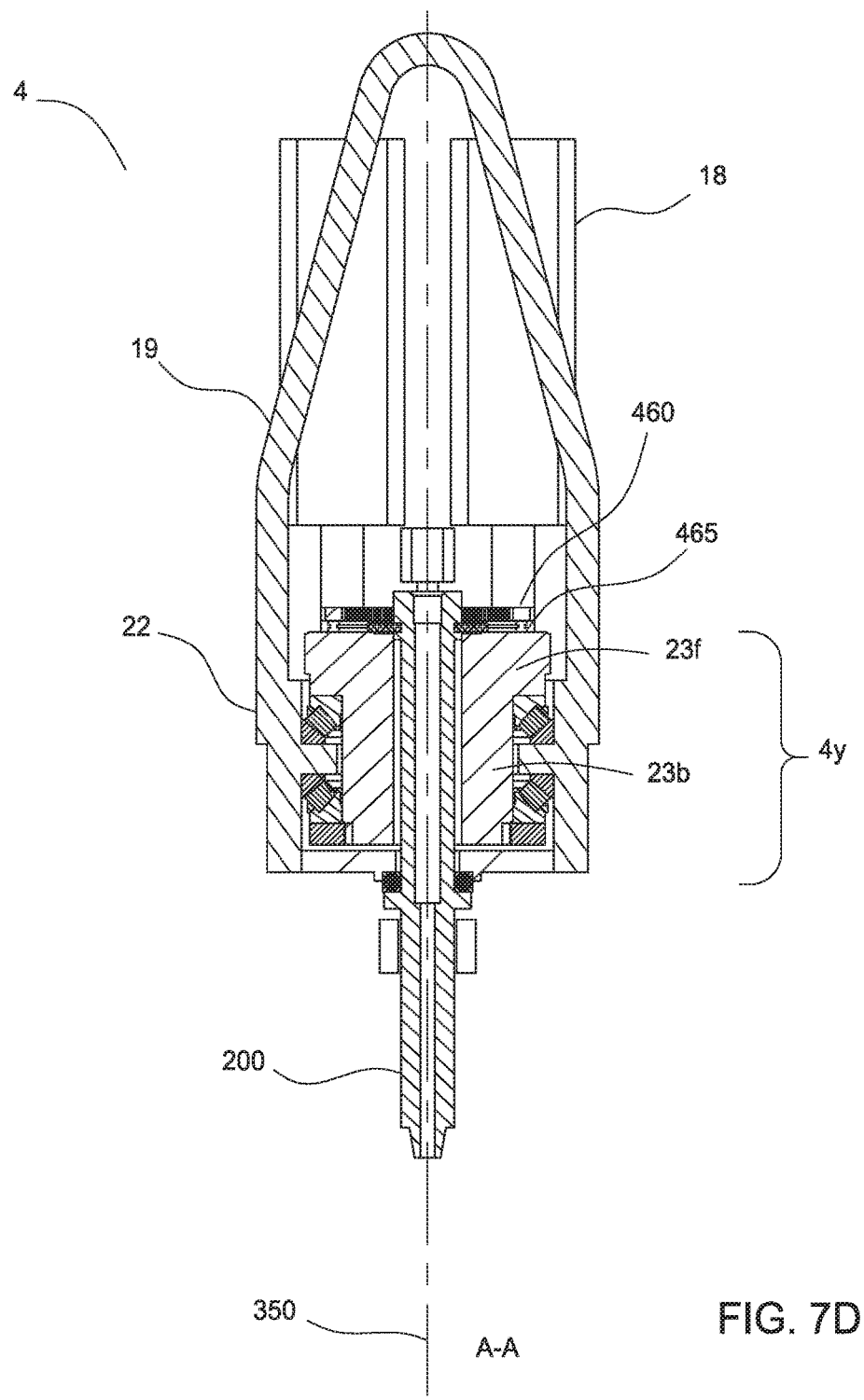
Figure 7E:
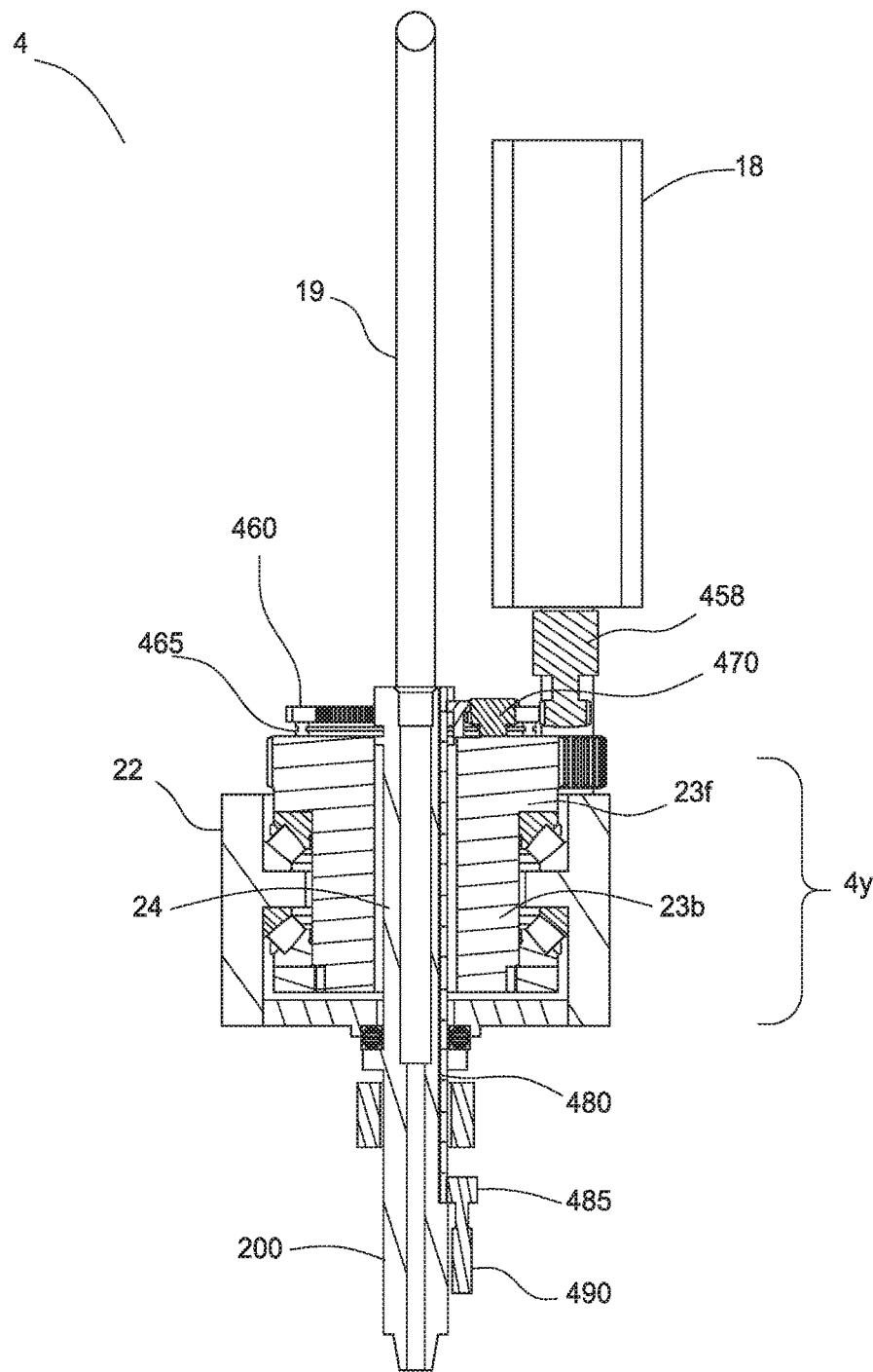

FIG. 7C illustrates an embodiment of mechanical power coupling as seen from above top drive 4. FIG. 7D illustrates the same embodiment in cross-section A-A of FIG. 7C. FIG. 7E illustrates the same embodiment in cross-section B-B of FIG. 7C. In this embodiment, the mechanical power coupling includes slewing ring 460 and one or more gears (e.g., transfer gear 475), grooved sleeves, and axles (e.g., drive axle 480) acting with slewing ring 460 to supply power to tool unit 200. Slewing ring 460 is disposed on the top surface of flange 23f of torque drive body 23 with a low friction coupling (e.g., bearings 465). Drive axle 480 may be disposed in a groove in tool dock 24 and/or tool unit 200. Revolving gear 470 may provide rotational force to drive axle 480. Revolving gear 470 may further power drive axle 480 to convey rotation to generator gear 485. Generator gear 485 thereby powers local power supply 490 (e.g., an electric generator, a hydraulic pump, or an energy buffer) on tool unit 200. Any or all of generator gear 485, local power supply 490, the electric generator, the hydraulic pump, and the energy buffer on tool unit 200 may thereby act as power consumers.

In an exemplary embodiment, fixed gear 450 may have a diameter of between about 0.15 and about 0.25 ft, slewing ring 460 may have a diameter of between about 1.5 and about 2.5 ft, revolving gear 470 may have a diameter of between about 0.15 and about 0.25 ft, and drive axle 480 may have a diameter of between about 0.05 and about 0.15 ft. When the tool unit 200 is not rotating relative to top drive 4, fixed gear 450 may turn counter-clockwise at a speed of about 2500 rpm. A servo motor 458 on drive body 22 may be used to actuate and maintain fixed gear 450's speed. The power might be 1 kW, so the torque supplied by fixed gear 450 is 28.2 ft-lbf. In reaction to the rotation of fixed gear 450 (since the tool unit 200 is not turning), slewing ring 460 turns clockwise with 250 rpm. The torque of 282 ft-lbf is applied, but the torque drive body 23 is fixed by a brake. Revolving gear 470 thereby turns clockwise with 2500 rpm. Transfer gear 475 transfers power from revolving gear 470 to drive axle 480. Drive axle 480 turns with 5000 rpm and 14 ft-lbf. This example may occur during the casing job operations, especially during the activation of the slips.

In another embodiment, the top drive 4 may supply power to a tool unit 200 via wireless power coupling. In one example, inductive coupling may be used to supply power both for activities that require lower power loads (e.g., about 2 W-about 20 W) and for activities requiring additional power between about 20 W and about 1 kW.

As illustrated in FIG. 3, wireless power coupling 42 may include a shaft member 42r connected to the torque shaft 35 and an interface member 42s housed in an encapsulation on the interface box 47. The wireless power coupling members 42r,s may each be inductive coils. Even though the wireless power coupling 42 supplies power from the stationary interface member 42s to the rotatable shaft member 42r, the wireless power coupling 42 is devoid of any mechanical contact between the interface member 42s and the shaft member 42r. In general, the wireless power coupling 42 acts similar to a transformer in that it employs electromagnetic induction to transfer electrical energy from one circuit, via a primary coil (e.g., component of interface member 42s), to another, via a secondary coil (e.g., component of shaft member 42r), and does so without direct connection between circuits (i.e., the primary and secondary coils are structurally decoupled from each other). Other examples and applications of inductive couplings are described in U.S. Pat. No. 7,882,902, which is assigned to the same assignee as the present application and is herein incorporated by reference.

Inductive coupling benefits from having no moving parts, resulting in less system wear and greater reliability. However, standard inductive coupling may suffer energy losses if the magnetic field protrudes into surrounding metals, especially ferromagnetic materials. Standard inductive coupling may also suffer energy losses due to non-ideal magnetic coupling of the coils. Inductive energy losses may further impede operations by heating surrounding metals, thereby creating hazardous conditions, particularly when used near flammable materials.

In another embodiment, the wireless power coupling in conjunction with a local energy buffer may be configured to supply higher power load demands (e.g., about 1 k W-about 20 kW). In one embodiment, the wireless power coupling may include: a) ferrite segments that guide the magnetic field to avoid losses in surrounding metal, and/or b) a resonant coupling of the primary and secondary coil system. In some embodiments, the use of ferrite segments and/or resonant coupling may allow the wireless power coupling in conjunction with a local energy buffer to supply at least about 2 kW for at least about 10 s.

Figure 8A:
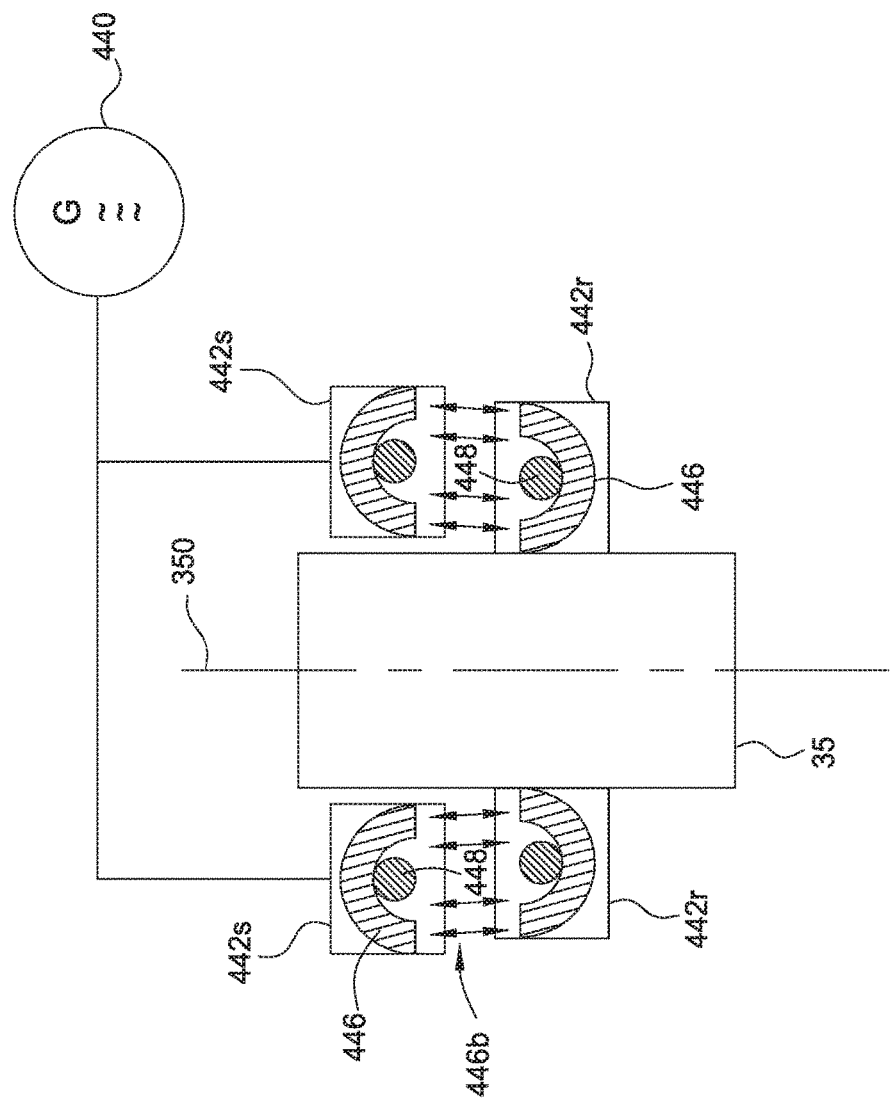
FIG. 8A,B illustrates a wireless power coupling according to an embodiment of the present disclosure.
Figure 8B:
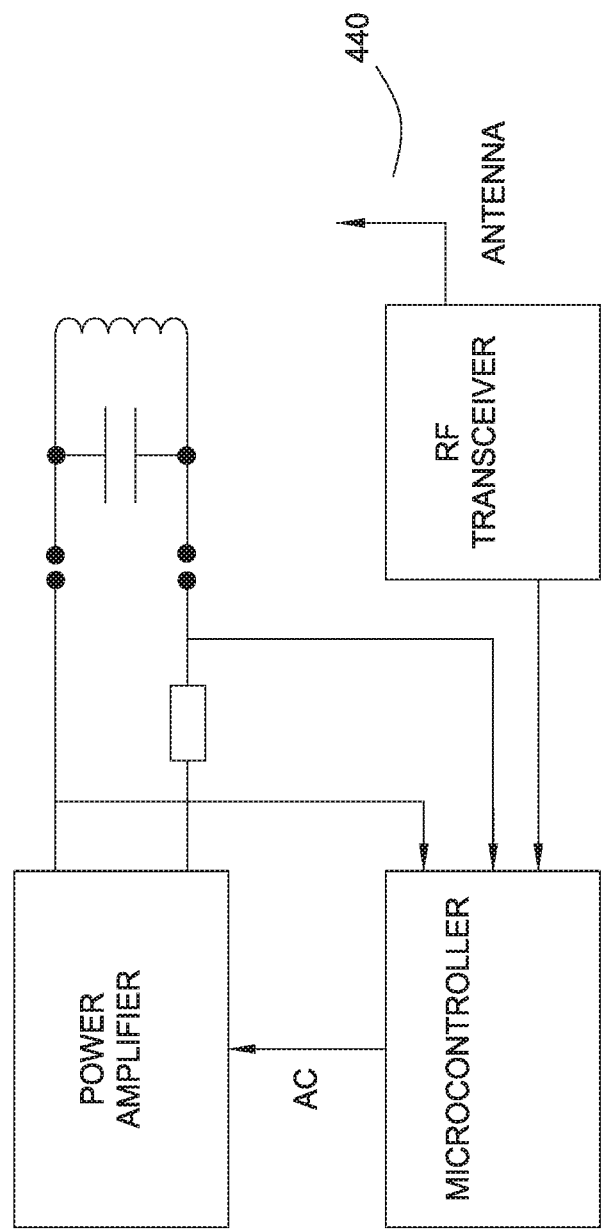

An exemplary wireless power coupling is illustrated in FIGS. 8A-8B. Torque shaft 35 of a tool unit 200 is connected to wireless power coupling shaft member 442r (secondary coil system), which includes a ferrite segment 446 and one or more coils 448. Likewise, wireless power coupling interface member 442s (primary coil system) includes a ferrite segment 446 and one or more coils 448. FIG. 8A illustrates a cross-section through the center of torque shaft 35. In this embodiment, wireless power coupling shaft member 442r and wireless power coupling interface member 442s encircle torque shaft 35. In other embodiments the wireless power coupling members may be one or more broken or partial rings, segments, or arcs to better serve operational needs. The coils 448 will typically comprise about 1 to 4 turns of copper pipe. The ferrite segments 446 may be divided into pieces. Note that, unlike a typical power transformer, the wireless power coupling members 442r,s do not share a single ferrite segment 446. At times during operation, torque shaft 35 may rotate about its central axis 350, causing wireless power coupling shaft member 442r to likewise rotate. At other times during operation, torque shaft 35 may not rotate. Wireless power coupling interface member 442s remain essentially fixed, being attached directly or indirectly to the top drive 4 (FIG. 2A). A high frequency (e.g., between about 40 kHz and 60 kHz) generator 440 on the top drive 4 may help to drive the primary coil in the wireless power interface member 442s. Use of a high frequency generator 440, as illustrated in FIG. 8B, allows for power transfer through inductive coupling both when torque shaft 35 is rotating and when it is still relative to top drive 4. Ferrite segments 446 generate a magnetic field 446B between the wireless power coupling shaft member 442r and the wireless power coupling interface member 442s. Magnetic field 446B acts to align the magnetic fields of the coils 448 in the wireless power coupling shaft member 442r with the magnetic fields of the coils 448 in the wireless power coupling interface member 442s. In an embodiment, the fixation of wireless power coupling interface member 442s to top drive 4 allows for a minimal amount of movement as would be required to align the magnetic fields of the coils 448. Alternatively or additionally, the connection of wireless power coupling shaft member 442r to torque shaft 35 may also allow for a minimal amount of movement as would be required to align the magnetic fields of the coils 448. Such alignment may reduce energy-damping induction into surrounding steel.

Even with alignment of the magnetic field, the coupling coefficient of the coils (the fraction of the flux of the primary that cuts the secondary coil) will still be less than 1, decreasing the efficiency. For example, due to an air gap between the coils, the coupling coefficient might be only 0.5, resulting in unacceptable power losses. This can be compensated by using resonant coupling techniques. When resonant coupling is used, each coil may be capacitively loaded so as to form a tuned LC circuit. If the primary and secondary coils are resonant at a common frequency, significant power may be transmitted between the coils over a range of a few times the coil diameters at reasonable efficiency. Running the secondary at the same resonant frequency as the primary ensures that the secondary has a low impedance at the transmitter's frequency and that the energy is better absorbed. It is believed that power transmission from the primary coil (i.e., wireless power coupling interface member 442s) to the secondary coil (i.e., wireless power coupling shaft member 442r) may be improved from about 20% without resonant coupling to at least about 80% with resonant coupling, and in some circumstances to as much as 95% with resonant coupling.

In an embodiment, a wireless power coupling may drive a local power supply, such as a local electric generator, a local hydraulic pump, an energy buffer and/or another local power supply (e.g., local power supply 490 in FIG. 9B) on tool unit 200. The wireless power coupling and/or such local power supply may be connected to an energy buffer (such as a battery, a supercapacitor, or a pressure reservoir). In an embodiment, the wireless power coupling may work with one or more of a local electric generator, a local hydraulic pump, a local power supply, and an energy buffer on tool unit 200 to meet operational needs, for example by providing higher power, more stable power, or to distribute power load amongst the systems. Any or all of the local electric generator, local hydraulic pump, local power supply, and energy buffer on tool unit 200 may thereby act as power consumers. As would be understood by one of ordinary skill in the art with the benefit of this disclosure, the location of wireless power coupling shaft member 442r on tool unit 200 and the location of wireless power coupling interface member 442s on top drive 4 may vary to meet operational needs. However, wireless power coupling shaft member 442r should be located at or near a rotating surface, wireless power coupling interface member 442s should be located at or near a non-rotating surface, and the two wireless power coupling members 442r,s should be separated by no more than about 1 inch.

The top drive 4 may supply power to power consumers of the tool units 200 through one or more non-hydraulic power supplies such as wireless power coupling, mechanical power coupling, and local power supply. The top drive 4 powers the non-hydraulic power supplies, which then supply power to the power consumers. Power may be supplied to the power consumers contemporaneously both from the local power supply and from at least one of the mechanical power coupling and the wireless power coupling. Appropriate selection and combination of such systems can meet operational power needs that may vary by peak load demand, steady-state load demand, time of load, power level control, and time to reach peak. For example, energy buffers may be located on the tool unit 200 to supply supplemental power to meet peak load or short time-to-peak power requirements. Suitable battery technology may include a Nanophosphate® AHP14 Lithium Ion Prismatic Cell, currently available from A123 Systems, LLC., but other lithium iron phosphate batteries may work as well. Suitable batteries would not have a thermal runaway effect, unlike standard battery technology used in cellphones and notebooks. Nonetheless, batteries should be mounted in a flameproof housing with adequate charge control. The size and weight of the batteries along with the flameproof housing may affect where the energy buffer may be located on the tool unit 200. For example, the batteries may weigh about 10-20 lbs, while the flameproof housing may add another about 20-40 lbs. The distribution of energy buffers on the tool unit 200 should be balanced to permit rotation of the tool unit 200. The number and type of batteries should be selected to provide sufficient power to actuate slips 57s several times between charging. In normal operations, expected time to fully charge the energy buffers may be no more that about 1-3 minutes.

FIG. 9A illustrates an example power cycle during slip actuation. The power load, buffered power flow (buffer charging is less than zero, buffer discharging is greater than zero), and buffered energy level is shown over time. Initially, the power load is low, with power consumers such as sensors online. The energy buffer charges during this period. At 10 s, slip activation begins: power load increases and buffered power flow switches from charging to discharging. From 10 s to 11 s, slips are activating, with an initial activation load that must overcome friction and move the slips until they get into contact with the pipe. From 11 s to 16 s, the power load increases as the slips are activated, loading energy between the slips and the casing. At 20 s, the slips are clamped, thereby capping the power demand. From 20 s to 21 s, the slips spring tension is locked by a self-locking mechanism. The casing connection is made up for the next 30 s, and the low power load allows the energy buffers to recharge. The slips are then released, requiring less power than for activating. The slips are in zero position from 53 s to 58 s. The operation continues with new pipe lifting below the casing tool unit.

FIG. 9B illustrates a top drive 4 capable of supplying power to power consumers of tool units 200 through one or more non-hydraulic power supplies such as wireless power coupling, mechanical power coupling, and local power supply. The top drive 4 powers the non-hydraulic power supplies, which then supply power to the power consumers. As illustrated, the coupling of CMC 4y of top drive 4 to tool unit 200 allows drive motors 18 to selectively rotate torque drive body 23, thereby selectively rotating tool dock 24 and tool unit 200. Wireless power coupling shaft member 442r rotate with tool unit 200, while wireless power coupling interface member 442s remain essentially fixed to top drive 4. Ferrite segments 446 act to align the magnetic fields of the coils 448 in the wireless power coupling shaft member 442*r* with the magnetic fields of the coils 448 in the wireless power coupling interface member 442*s*. Power is supplied in the form of electrical energy from wireless power coupling interface member 442*s* to wireless power coupling shaft member 442*r* via electromagnetic induction without direct connection between circuits. A servo motor 458 on drive body 22 causes controlled rotation of a fixed gear 450 which meshes with and causes rotation of slewing ring 460. Meshing of slewing ring 460 with revolving gear 470 supplies mechanical power to tool unit 200. For example, revolving gear 470 may drive a drive axle 480 and directly supply power to components of tool unit 200, such as rotating drive gear 410 to actuate slips 57*s* (FIG. 6). Alternatively or additionally, drive axle 480 may convey rotation to generator gear 485, thereby supplying mechanical power to a local power supply 490 (e.g., an electric generator, a hydraulic pump, or an energy buffer) on tool unit 200. The top drive 4 may therefore supply power to the tool units 200 through one or more of several systems, including wireless power coupling (e.g., inductive coupling), mechanical power coupling (e.g., drive axle or other connector for gearing), and local (on the tool unit) power supply (e.g., energy buffer). Appropriate selection and combination of such subsystems can meet operational power needs that may vary by peak load demand, steady-state load demand, time of load, power level control, and time to reach peak.

An embodiment discloses a method comprising: rotating a torque shaft of a tool unit with one or more drive motors on a top drive, wherein the tool unit is coupled to a revolving gear that is meshed with a slewing ring; actuating a fixed gear on the top drive; and rotating the slewing ring through at least one of the rotating the torque shaft and the actuating the fixed gear.

In one or more of the embodiments described herein, the method includes driving an electric generator on the tool unit with the revolving gear.

In one or more of the embodiments described herein, the method includes actuating slips with the revolving gear.

In one or more of the embodiments described herein, the method includes providing power to a local power supply on the tool unit with the revolving gear.

In one or more of the embodiments described herein, the local power supply is an energy buffer.

While the foregoing is directed to embodiments of the present disclosure, other and further embodiments of the disclosure may be devised without departing from the basic scope thereof, and the scope thereof is determined by the claims that follow.

The invention claimed is:

1. A top drive system comprising:
a top drive;
a tool unit having a power consumer; and
a non-hydraulic power supply having a wireless power coupling from the top drive to the tool unit having:
a wireless power coupling interface member comprising a first ferrite segment and a first coil; and
a wireless power coupling shaft member comprising a second ferrite segment and a second coil, wherein first and second ferrite segments are configured to align with one another, thereby aligning an induced magnetic field between the first and second coils;
wherein:
the power consumer is configured to receive power from the non-hydraulic power supply.

2. The system of claim 1 wherein the tool unit comprises a casing tool unit, and the power consumer is configured to actuate slips of the casing tool unit.

3. The system of claim 1 wherein the power consumer is at least one of an electric generator, an hydraulic pump, an energy buffer, a battery, a supercapacitor, a pressure reservoir, a data communication device, a data collection device, an identification device, a sensor, and an actuator.

4. The system of claim 1 wherein the wireless power coupling is configured to provide at least 80% power transmission from the wireless power coupling interface member to the wireless power coupling shaft member.

5. The system of claim 1, wherein the non-hydraulic power supply is capable of supplying at least 2 kW for at least 10 s.

6. The system of claim 1, further comprising a torque shaft coupled to the top drive.

7. The system of claim 6, wherein the wireless power coupling shaft member is connected to the torque shaft.

8. The system of claim 7, wherein the wireless power coupling shaft member encircles the torque shaft.

9. The system of claim 6, wherein the wireless power coupling interface member encircles torque shaft.

10. The system of claim 6, wherein the wireless power coupling shaft member is at least one of one or more broken or partial rings, segments, or arcs.

11. The system of claim 6, wherein the wireless power coupling interface member is at least one of one or more broken or partial rings, segments, or arcs.

12. The system of claim 1, wherein the wireless power coupling shaft member is rotatable relative to the wireless power coupling interface member.

13. The system of claim 1, further comprising a high frequency generator.

14. The system of claim 1, wherein the wireless power coupling interface member is attached to the top drive.

15. A method of operating a tool unit coupled to a top drive, comprising:
connecting a non-hydraulic power supply to a power consumer on the tool unit, the non-hydraulic power supply having a wireless power coupling from the top drive to the tool unit, the wireless power coupling having:
a wireless power coupling interface member comprising a first ferrite segment and a first coil; and
a wireless power coupling shaft member comprising a second ferrite segment and a second coil, wherein first and second ferrite segments are configured to align with one another, thereby aligning an induced magnetic field between the first and second coils;
powering the non-hydraulic power supply with the top drive; and
supplying power to the power consumer with the non-hydraulic power supply.

16. The method of claim 15, further comprising storing at least a portion of the supplied power in an energy buffer on the tool unit.

17. The method of claim 16, further comprising supplying power to the power consumer with the stored power in the energy buffer contemporaneously with supplying power to the power consumer with the wireless power coupling from the top drive.

18. The method of claim 15 wherein the tool unit is a casing tool, the method further comprising actuating slips of the casing tool.

19. The method of claim 15, further comprising resonant coupling the first coil and the second coil of the wireless power coupling.

20. The method of claim 15, wherein the power supplied is at least 2 kW for at least 10 s.

* * * * *